US012377023B1

(12) United States Patent
Wu et al.

(10) Patent No.: US 12,377,023 B1
(45) Date of Patent: Aug. 5, 2025

(54) FLUID TRANSFER DEVICE

(71) Applicant: Genzyme Corporation, Cambridge, MA (US)

(72) Inventors: Haiming Wu, Weston, MA (US); Danial Ferreira, Shelton, CT (US)

(73) Assignee: Genzyme Corporation, Cambridge, MA (US)

( * ) Notice: Subject to any disclaimer, the term of this patent is extended or adjusted under 35 U.S.C. 154(b) by 0 days.

(21) Appl. No.: 18/965,473

(22) Filed: Dec. 2, 2024

(51) Int. Cl.
*A61J 1/20* (2006.01)

(52) U.S. Cl.
CPC .................................. *A61J 1/2096* (2013.01)

(58) Field of Classification Search
CPC ........ A61J 1/2089; A61J 1/201; A61J 1/2096; A61J 1/2013; A61J 1/2058; A61J 1/10; A61J 1/2075; A61J 1/2082; A61J 1/2051; A61J 1/2062; A61J 1/20; A61J 1/2048; A61J 1/2037; A61J 1/2065; A61J 1/2068; A61J 1/2017; A61M 5/162; A61M 39/223
See application file for complete search history.

(56) References Cited

U.S. PATENT DOCUMENTS

| | | | |
|---|---|---|---|
| 4,997,430 | A | 3/1991 | Van der Heiden et al. |
| 5,466,220 | A | 11/1995 | Brenneman |
| 6,474,375 | B2 | 11/2002 | Spero et al. |
| 6,478,771 | B1 | 11/2002 | Lavi et al. |
| 6,558,365 | B2 | 5/2003 | Zinger et al. |
| 7,326,194 | B2 | 2/2008 | Zinger et al. |
| 7,896,849 | B2 | 3/2011 | Delay |
| 8,425,487 | B2 | 4/2013 | Beiriger et al. |
| 8,562,584 | B2 | 10/2013 | Beiriger et al. |
| 9,132,061 | B2 | 9/2015 | Beiriger |

(Continued)

FOREIGN PATENT DOCUMENTS

| | | | |
|---|---|---|---|
| EP | 2842540 | A1 | 3/2015 |
| WO | WO 2004/058820 | A2 | 7/2004 |

(Continued)

OTHER PUBLICATIONS

Hamers-Casterman et al., "Naturally occurring antibodies devoid of light chains," Nature, Jun. 3, 1993, 363(6428):446-448.

(Continued)

*Primary Examiner* — Kai H Weng
(74) *Attorney, Agent, or Firm* — Fish & Richardson P.C.

(57) ABSTRACT

A fluid transfer device comprises a body comprising a first connecting portion comprising a first fluid channel to fluidically communicate with an interior of a diluent container, a second connecting portion comprising a second fluid channel to fluidically communicate with an interior of a medicament container, a third connecting portion comprising a third fluid channel to fluidically communicate with an interior of a pooling container, and a fourth fluid channel to fluidically communicate with a pump device. A movable part is engaged with and movable relative to the body to transfer the fluid transfer device into one of a first configuration, a second configuration and a third configuration. When in the first configuration, the second fluid channel is fluidically coupled to the third fluid channel, and when in the second configuration, the first fluid channel is fluidically connectable to the third fluid channel.

15 Claims, 6 Drawing Sheets

(56) References Cited

U.S. PATENT DOCUMENTS

| | | | | |
|---|---|---|---|---|
| 9,339,438 | B2 | 5/2016 | Lev et al. | |
| 9,345,643 | B2 | 5/2016 | Okiyama | |
| 10,420,927 | B2 | 9/2019 | Fangrow | |
| 10,688,295 | B2 | 6/2020 | Lev et al. | |
| 10,765,604 | B2 | 9/2020 | Denenburg et al. | |
| 10,945,921 | B2 | 3/2021 | Denenburg | |
| 11,642,285 | B2 | 5/2023 | Deneburg et al. | |
| 11,786,443 | B2 | 10/2023 | Lev et al. | |
| 12,161,839 | B1 * | 12/2024 | Lau | A61M 5/162 |
| 12,171,719 | B1 | 12/2024 | Wu et al. | |
| 12,213,944 | B1 | 2/2025 | Wu et al. | |
| 12,226,371 | B1 | 2/2025 | Wu et al. | |
| 2008/0269680 | A1 | 10/2008 | Ibranyan et al. | |
| 2011/0087164 | A1 | 4/2011 | Mosler et al. | |
| 2019/0381237 | A1 | 12/2019 | Desbrosses et al. | |
| 2021/0154097 | A1 | 5/2021 | McLoughlin et al. | |
| 2021/0228446 | A1 | 7/2021 | Herrmann | |
| 2023/0052165 | A1 | 2/2023 | Bar-El et al. | |
| 2023/0321337 | A1 * | 10/2023 | Levy | A61M 5/16827 |

FOREIGN PATENT DOCUMENTS

| | | | |
|---|---|---|---|
| WO | WO 2004/068820 | A2 | 8/2004 |
| WO | WO 2005/018629 | A1 | 3/2005 |
| WO | WO 2006/003388 | A2 | 1/2006 |
| WO | WO 2006/030220 | A1 | 3/2006 |
| WO | WO 2007/017868 | A1 | 2/2007 |
| WO | WO 2020/208626 | A1 | 10/2020 |

OTHER PUBLICATIONS

Holt et al., "Domain antibodies: proteins for therapy," Trends in Biotechnology, Nov. 2003, 21(11):484-490.

Muyldermans, "Single domain camel antibodies: current status," Reviews in Molecular Biotechnology, Jun. 2001, 74(4):277-302.

Needle-based injection systems for medical use Requirements and test methods, Part 1: Needle injection systems, ISO 11608-1:2014(E), Third Edition, Switzerland, ISO, Dec. 15, 2014, pp. 1-13.

Ward et al., "Binding activities of a repertoire of single immunoglobulin variable domains secreted from *Escherichia coli*," Nature, Oct. 1, 1989, 341(6242):544-546.

U.S. Appl. No. 18/666,279, filed May 16, 2024, Haiming Wu.

U.S. Appl. No. 18/666,379, filed May 16, 2024, Haiming Wu.

U.S. Appl. No. 18/666,417, filed May 16, 2024, Haiming Wu.

International Search Report and Written Opinion in International Appln. No. PCT/US2024/061704, mailed on May 2, 2025, 17 pages.

International Search Report and Written Opinion in International Appln. No. PCT/US2025/010525, mailed on Apr. 25, 2025, 16 pages.

* cited by examiner

FLUID TRANSFER DEVICE

TECHNICAL FIELD

The present disclosure relates to the field of fluid transfer devices, specifically, to fluid transfer devices configured for transferring a fluid between a diluent container, a medicament container and a pooling container, e.g., for preparing, reconstituting and/or diluting a liquid medicament and/or for administering a medicament by way of injection or infusion. In another aspect the present disclosure relates to a kit comprising a fluid transfer device. In still another aspect the disclosure relates to methods of transferring a fluid between a diluent container, a medicament container and a pooling container, e.g., for the purpose of preparing, diluting and/or reconstituting a medicament for administering the medicament by way of infusion or injection.

BACKGROUND

Patients suffering from certain diseases like, for example, haemophilia or requiring enzyme replacement therapy have to take regular intravenous (IV) infusions. The infusions often have to be mixed and prepared, sometimes to the specific needs of the patient, (and sometimes a short time before drug administration) which may include reconstitution of the drug powder from multiple vials using an exact amount of sterile liquids like water and/or saline. As this preparation process is typically complex and tedious, it is usually performed by a health care professional in a clinic or pharmacy, potentially using lab equipment.

Generally, administering a medicament by way of infusion may require a rather clean or sterile environment. A patient may therefore have to regularly visit an ambulance or health care center.

Self-medication or home-medication for administering a medicament through infusion or injection is and remains quite challenging but is very attractive for patients thereby avoiding problems and circumstances involved in visiting a health care center. With home- or self-medication a patient or user, e.g., intending to establish a vascular access to a patient's body, may be obliged to use only one hand, which might be rather cumbersome and thus challenging.

In addition, it is often required to establish or maintain a clean and/or sterile environment especially in the field of home-medication or self-medication as well as providing of a clean and sterile storage environment for medicaments and medicament containers, medical device accessory and medical devices.

It is therefore desirable to provide improvements in the field of home medication or self-medication, which allow a user or caregiver to prepare and to administer a medicament by way of injection or infusion. Furthermore, there should be provided improvements in guiding and assisting a user in conducting or executing numerous steps in the course of preparing medicaments and/or in the course of preparing administering of a medicament, e.g., by way of infusion or injection.

Some medicaments to be administered by injection or infusion may be provided in a co-called injection vial, either in liquid or powdered form. Such injection vials typically comprise a barrel filled with the medicament either in a liquid or powdered form. The barrel is typically sealed towards an outlet by a pierceable stopper. The pierceable stopper may be fixed to a barrel head, which may also provide a mechanical fastening for a vial adapter.

Vial adapters are widely known in the art and may provide a well-defined fastening to the barrel head of an injection vial. They may comprise a spike to penetrate the pierceable stopper sealing the outlet of the injection barrel. The spike is typically in fluid communication with a connector, e.g., implemented as a standardized connector that may provide a mechanical fastening of an injection device so that the liquid content provided inside the injection vial can be withdrawn by the injection device, e.g., by a syringe or the like medicament container connectable to the vial adapter.

Controlling of an amount of a diluent to be withdrawn from a diluent container and/or controlling of an amount of reconstituted liquid medicament to be introduced into a diluent container or into one of an infusion container or medicament delivery container can be quite elaborate. Generally, a syringe with a tipped cannula may be used for withdrawing a well-defined amount of a diluent from a diluent container and to introduce a well-defined amount of the diluent into a medicament container for reconstituting the medicament. Use of a separate syringe for withdrawing and expelling liquid substances requires respective skills of an operator or user. When diluent containers or medicament containers are sealed by a pierceable seal, e.g., a septum, there may be always a certain risk of puncture during use, i.e. a user may accidentally suffer a puncture injury.

Moreover, some medicaments may be stored and commercially distributed in a highly concentrated form, which is not suitable for direct administration by infusion or injection. Here, the medicament may have to be diluted in a controlled manner and, according to a patient's prescription, a well-defined amount of the pharmaceutical substance may have to be transferred into an in infusion or injection container, such as an infusion bag in the course of preparing the medicament. Also here, connecting and disconnecting a syringe with regard to diluent containers or medicament containers may be always accompanied by a non-neglectable risk of contamination.

It is therefore desirable to improve a transfer of a fluid between a diluent container and a medicament container for both, reconstituting or diluting a medicament and for providing the reconstituted or diluted medicament to a delivery assembly, a delivery device or to an infusion container, such as an infusion bag.

In further scenarios of use, a total amount of a pharmaceutical substance provided in a medicament container may be insufficient to comply with a patient's prescription. For a given infusion or injection procedure it may be required that the content of numerous medicament containers has to be administered to the patient by way of injection or infusion. Here, a pooling of the medicament, e.g., provided in liquid or powdered form in a number of individual medicament containers, may be required. Such a pooling may also come along with a non-neglectable risk of contamination or puncture injury.

SUMMARY

The above-mentioned disadvantages and shortcomings are solved by a fluid transfer device, by a kit, e.g., implemented as an infusion kit, and by methods of transferring a fluid between a diluent container, a medicament container and a pooling container in accordance with the features of the independent claims. Various examples and embodiments are subject matter of the dependent claims, respectively.

In one aspect there is provided a fluid transfer device for transferring a fluid between a diluent container, a medicament container and a pooling container. The fluid transfer device comprises a body. The fluid transfer device further comprises a first connecting portion to connect to the diluent container. The first connecting portion comprises a first fluid channel to fluidically communicate with an interior of the diluent container, specifically, when the first connecting portion of the fluid transfer device is connected to the diluent container.

The fluid transfer device further comprises a second connecting portion to connect to the medicament container. The second connecting portion comprises a second fluid channel to fluidically communicate with an interior of the medicament container, specifically, to communicate with the interior of the medicament container when the second connecting portion of the fluid transfer device is connected to the medicament container.

The fluid transfer device further comprises a third connecting portion to connect to the pooling container. The third connecting portion comprises a third fluid channel to fluidically communicate with an interior of the pooling container, specifically, to communicate with the interior of the pooling container when the third connecting portion of the fluid transfer device is connected to the pooling container.

The fluid transfer device further comprises a fourth fluid channel to fluidically communicate with a pump device.

the fluid transfer device also comprises a movable part, which is engaged with the body and which is movable relative to the body to transfer the fluid transfer device into one of a first configuration, a second configuration and a third configuration. Accordingly, the fluid transfer device is reconfigurable between a first configuration, a second configuration and a third configuration.

In some examples the fluid transfer device is switchable between the first configuration, the second configuration and the third configuration. The fluid transfer device may be manually switchable, e.g., by a user or operator of the fluid transfer device. This way, a user is given the possibility to switch the fluid transfer device from a first configuration into one of the second configuration and the third configuration. The fluid transfer device may be also switchable from the second configuration into one of the first configuration and the third configuration. Moreover, the fluid transfer device may be switchable from the third configuration into one of the first configuration and the second configuration.

According to some examples the fluid transfer device may be switchable from the first configuration into the third configuration via the second configuration. Here, the second configuration may be one of an intermediate configuration and a transitional configuration, wherein a direct switching from the first configuration into the third configuration may be prevented.

In the alternative configurations the fluid transfer device provides different fluid transferring couplings between the first fluid channel, the second fluid channel, the third fluid channel and the fourth fluid channel.

In the first configuration of the fluid transfer device the second fluid channel is fluidically coupled to the third fluid channel to allow and/or to support a flow of fluid from the medicament container into the pooling container.

In the second configuration of the fluid transfer device, the first fluid channel is fluidically connectable or is fluidically coupled to the third fluid channel to allow a flow of fluid from the diluent container into the pooling container.

In the first configuration the first fluid channel may be fluidically disconnected from any other of the second flow channel, the third fluid channel and the fourth fluid channel. Also, in the first configuration, the fourth fluid channel may be fluidically disconnected from any other of the first fluid channel, the second fluid channel and the third fluid channel.

In other examples, and when in the first configuration the fourth fluid channel may be fluidically connected or may be fluidically coupled to the second fluid channel and to the third fluid channel. Here, and when a pump device is fluidically connected to the fourth fluid channel there may be selectively applied a positive pressure and/or a negative pressure to the fourth fluid channel. Here, a negative pressure may be effective to transfer a fluid from the medicament container, through the second fluid channel, through the fourth fluid channel and into the pump device. A positive pressure may be effective to transfer a fluid from the pump device through the fourth fluid channel, through the third fluid channel and into the pooling container.

When in the first configuration the second and third fluid channels are fluidically connected or fluidically coupled. They are thus configured to form or to constitute a fluid connection between the medicament container and the pooling container.

When in the second configuration of the fluid transfer device the second fluid channel may be disconnected from the third flow channel. Here, the third fluid channel may be fluidically coupled to the first fluid channel in a unidirectional manner. Hence, the fluid connection between the first fluid channel and the third fluid channel may only support and allow a flow of fluid from the medicament container into the pooling container, hence a flow of fluid from the first fluid channel into the third fluid channel. The fluid connection may be configured to block or to prevent a flow of fluid in the opposite direction, hence from the pooling container into the diluent container and hence from the third fluid channel into the first fluid channel.

When in the first configuration there may be provided a unidirectional and direct fluid communication from the second fluid channel to the third fluid channel. There may be further provided a unidirectional and direct fluid communication from the third fluid channel into the second fluid channel. In the first configuration the fluid transfer devices configured to transfer a medicament originally provided in a medicament container and connected to the second connecting portion into a pooling container connected to the third connecting portion.

In the first configuration of the fluid transfer device, the fluid transfer device is particularly configured for pooling or collecting of a medicament in the pooling container. Here, and by connecting a medicament container to the second connecting portion the liquid medicament originally provided in the medicament container is allowed are supported to flow from the medicament container through the fluid transfer device into the pooling container. Thereafter, the empty medicament may be replaced by another or further medicament container so as to collect and/or to pool an amount of a pharmaceutical substance in the pooling container.

In the second configuration of the fluid transfer device, the fluid transfer device is particularly configured for diluting the pharmaceutical substance or the medicament located in the pooling container, namely by allowing and/or by supporting a flow of fluid from the diluent container into the pooling container.

According to some examples, the transfer of a liquid substance from the diluent container, e.g., a diluent, into the pooling container may be inducible and/or controllable by a pump device fluidically connected to the fourth fluid channel. Here, and when in the first configuration the fourth fluid channel may be fluidically coupled to at least one of the second fluid channel and the third fluid channel. According to some examples and when the fluid transfer device is in the first configuration the fourth fluid channel may be fluidically coupled to the second fluid channel to support and/or to allow a flow of fluid from the second fluid channel to and through the fourth fluid channel towards and into the pump device. Here, the fourth fluid channel may be also fluidically coupled to the third fluid channel to support and/or to allow a flow of fluid from the fourth fluid channel to and through the third fluid channel towards and/or into the pooling container.

According to a further example the first connecting portion comprises a diluent container spike, which is configured to penetrate a pierceable seal of the diluent container. The first fluid channel extends into or through the diluent container spike. The first fluid channel may at least partially overlap with a lumen of the diluent container spike. In some examples the diluent container spike may be an integral part of the first body part. It may form or constitute the first body part. The diluent container spike may comprise an elongated shaft extending in the longitudinal direction. A proximal end of the diluent container spike may comprise a tipped end configured to pierce the pierceable seal of the diluent container. A distal end of the diluent container spike and/or a distal end of the first body part may be located in a cup-shaped receptacle of the second body part.

In some examples the second fluid channel and/or the second connecting portion may protrude transversal from a cup-shaped receptacle of the body. The body may comprise a tubularly-shaped sidewall with the second connecting portion and/or the second fluid channel extending in a radial direction outwardly from the sidewall of the second body part.

In some examples the diluent container comprises a flexible bag comprising one or several pliable sheets of material, which may be welded together along a circumferential seam. In some examples the medicament container comprises a solid barrel, e.g., a vitreous barrel comprising a tubular shape. The medicament container may comprise an outlet, which may be provided at a barrel head of the medicament container. In some examples the barrel comprises a tubular sidewall extending into a radially narrowing shoulder portion toward the outlet end. The shoulder portion may in turn extend into a slightly radially widened head. The widened head may be provided with a pierceable seal, stopper or septum.

The medicament container spike may comprise a cannula, e.g., in the form of a tipped needle with a hollow through bore, which may be fluidically connected with the second fluid channel. The diameter of the medicament container spike may be smaller than the diameter of the diluent container spike.

In some examples the diluent container spike may comprise a plastic material. The medicament container spike may be also made of a plastic material. Both, the diluent container spike and the medicament container spike may be provided or formed by an injection molded plastic component.

According to a further example the second connecting portion comprises a receptacle to receive a barrel or a barrel head of the medicament container. The receptacle may be formed as a cup-shaped receptacle. It may comprise a top or bottom portion, which may form or constitute a longitudinal stop, which is operable to limit a longitudinally directed insert motion of the barrel head into the receptacle of the second connecting portion. The receptacle may be configured to engage with the barrel head mechanically. In some examples the receptacle may be configured to form a friction fit with the barrel head. In further examples the receptacle may be configured to form a snap fit engagement with the barrel or barrel head of the medicament container. In this way, the medicament container may be fixed to the second connecting portion.

In some examples the receptacle and the barrel head may be configured to form a snap fit connection allowing to fix the medicament container to the second connecting portion. Here, the mutual connection between the connecting portion and the medicament container may be of particular stability, which is sufficient to keep and to fix the medicament container fastened to the second connecting portion during, introduction of a diluent into the medicament container, conducting a well-defined reconstitution process of the medicament inside the medicament container and withdrawal of the reconstituted medicament from the medicament container.

According to a further example the receptacle of the second connecting portion comprises a sidewall. The sidewall comprises numerous sidewall segments, at least some of which comprising a snap feature to engage with the barrel head. The sidewall segments may be separated by longitudinal slits. The sidewall segments may be flexible to a certain degree in a direction perpendicular or transverse to the elongation of the medicament container spike. In this way the individual sidewall segments may provide a snap fit engagement with the stepped down section of the barrel head, i.e., where the barrel head transitions into the radial and narrowed neck portion of the barrel.

In some examples the entirety of the barrel head of the medicament container may be securely fastened inside the receptacle as a snap feature of the sidewall segments snaps under the barrel head. In this way there can be provided a detachable or releasable mutual fixing between the sidewall of the receptacle and the barrel head and hence between the second connecting portion and the medicament container.

According to a further example the third connecting portion comprises a receptacle to receive a barrel or a barrel head of the pooling container. The receptacle may be formed as a cup-shaped receptacle. It may comprise a top or bottom portion, which may form or constitute a longitudinal stop, which is operable to limit a longitudinally directed insert motion of the barrel head into the receptacle of the third connecting portion. The receptacle may be configured to engage with the barrel head mechanically. In some examples the receptacle may be configured to form a friction fit with the barrel head. In further examples the receptacle may be configured to form a snap fit engagement with the barrel or barrel head of the pooling container. In this way, the pooling container may be fixed to the third connecting portion.

In some examples the receptacle and the barrel head may be configured to form a snap fit connection allowing to fix the pooling container to the third connecting portion. Here, the mutual connection between the third connecting portion and the pooling container may be of particular stability, which is sufficient to keep and to fix the pooling container fastened to the third connecting portion during introduction of a medicament and/or of a diluent into the pooling container, during conducting a well-defined reconstitution or diluting process of the medicament inside the pooling container and for withdrawal of the diluted medicament from the pooling container.

According to a further example the receptacle of the third connecting portion comprises a sidewall. The sidewall comprises numerous sidewall segments, at least some of which comprising a snap feature to engage with the barrel head.

The sidewall segments may be separated by longitudinal slits. The sidewall segments may be flexible to a certain degree in a direction perpendicular or transverse to the elongation of the pooling container spike. In this way the individual sidewall segments may provide a snap fit engagement with the stepped down section of the barrel head, i.e., where the barrel head transitions into the radial and narrowed neck portion of the barrel.

In some examples the entirety of the barrel head of the pooling container may be securely fastened inside the receptacle as a snap feature of the sidewall segments snaps under the barrel head. In this way there can be provided a detachable or releasable mutual fixing between the sidewall of the receptacle and the barrel head and hence between the third connecting portion and the pooling container.

According to a further example of the fluid transfer device the body comprises a fourth connecting portion comprising the fourth fluid channel. The fourth connecting portion comprises a mechanical connector configured to connect with a mechanical counter connector of the pump device in a fluid transferring manner. The mechanical connector may comprise a standardized fluid transferring connector, such as one of a male or female Luer-type connector. The mechanical counter connector may be implemented as the other one of a male or female Luer-type connector. In this way, a pump device with a suitable mechanical counter connector can be detachably connected to the fourth connecting portion. The pump device may be configured to provide or to generate negative as well as positive pressure to the third fluid channel in order to withdraw and/or to expel a fluid the through the third fluid channel.

In some examples the mechanical connector comprises a receptacle to receive a complementary shaped protrusion of the mechanical counter connector. In some examples the receptacle of the mechanical connector comprises a tapered or conical shape. Accordingly, the mechanical counter connector comprises a conically-shaped protrusion to fit and/or to engage with the tapered or conically shaped sidewall of the receptacle of the mechanical connector.

In further examples the pump device may be integrally formed with the fluid transfer device. Here, the fluid transfer device may comprise a pump device or a pump device section, which may be integrally formed with the body of the fluid transfer device. Here, the pump device may be integrally formed with the body of the fluid transfer device. With an integration of the pump device the fluid transfer device may be void of a fourth connecting portion. The pump device may be in permanent fluid coupling with the fourth fluid channel.

According to a further aspect the present disclosure also relates to a kit, e.g., implemented as an infusion kit. The kit comprises a fluid transfer device as described above. The kit further comprises a diluent container, which is connectable or which is connected to the first connecting portion of the fluid transfer device. The kit further comprises a medicament container, which is connectable or which is connected to the second connecting portion of the fluid transfer device and the kit further comprises a pooling container, which is connectable or which is connected to the third connecting portion of the fluid transfer device. The kit further comprises a pump device, which is connectable or which is connected to the fourth fluid channel of the fluid transfer device. With the kit, a flow of fluid between the first, the second, the third and the fourth fluid channels can be provided in a manner as described above.

Insofar and since the kit comprises a fluid transfer device as described above, all features, effects and benefits as described above in connection with the fluid transfer device equally apply to the infusion kit; and vice versa.

According to some examples the medicament container comprises a medicament vial, which is sealed by a puncturable seal, such as a septum. According to some examples the pooling container comprises a pooling vital, which is sealed by a puncturable seal, such as a septum. the medicament vial or pooling vial may comprise a barrel made of a pharmaceutically inert material, such as glass or certain plastic materials, such as cyclic olefin polymer (COP) or cyclic olefin copolymer (COC).

According to some examples the diluent container comprises a diluent vial or a diluent bag. The diluent vial may also comprise a barrel sealed by a pierceable seal. The diluent bag may comprise one or numerous flexible sheets, e.g., made of a plastic or polymeric material, which may be welded along a circumferential seam to enclose an interior volume.

With the diluent container connected to the first connecting portion and the medicament container connected to the second connecting portion and with the pump device connected to the third fluid channel the kit may provide a well-defined withdrawal of a diluent from the diluent container.

In some examples the pump device comprises a syringe, e.g., a manually operable syringe. The syringe may comprise a mechanical counter connector configured to fluidically connect to the third connecting portion of the body of the fluid transfer device. In further examples the syringe may be integrally formed with the body of the fluid transfer device. The syringe may comprise a tubular-shaped barrel and a plunger longitudinally movable relative to the barrel inside the barrel. The plunger may seal the interior of the barrel towards a direction opposite to the outlet or inlet end and hence opposite to the mechanical counter connector of the syringe or pump device.

The barrel of the syringe may be provided with a visual scale, e.g., extending along the longitudinal direction of the syringe barrel. In this way, and with a transparent or semi-transparent barrel of the syringe, the amount of a liquid drawn into the syringe barrel or expelled from the syringe barrel can be precisely controlled.

In some examples the pump device comprises a manually operable pump device. Here, a user may have to provide an operation force to generate at least one of a positive or negative pressure to the third fluid channel of the fluid transfer device. A manually operable pump device, such as a syringe, is rather easy and cost efficient to implement and may provide an immediate and intuitive control and feedback for withdrawing or expelling a liquid substance.

In some examples the pump device comprises an electromechanical pump device. Here, the pump device may comprise an electrically operated drive by way of which at least one of a positive or negative pressure can be generated, e.g., by activating the electric drive.

According to a further example of the fluid transfer device and when in the second configuration a flow of fluid from the pooling container into the diluent container is prevented. Hence, in the second configuration there is only allowed and provided a unidirectional flow of fluid from the diluent container towards and into the pooling container. Accordingly, when in the second configuration the fluid transfer device is in a diluting mode by way of which an amount of a diluent initially provided in the diluent container can be transferred in a rather controlled and well-defined manner into the pooling container. The liquid medicament located in the pooling container may be diluted accordingly.

When in the first configuration the fluid transfer device is in a so-called pooling mode. Here, and as long as the fluid transfer device is in the first configuration there is supported and/or allowed a flow of fluid from the medicament container connected to the second connecting portion to and into the pooling container connected to the third connecting portion. Accordingly, the second fluid channel is fluidically connected to and fluidically communicates with the third fluid channel to support a respective flow of fluid from the second fluid channel and hence from the medicament container towards and into the third fluid channel and hence towards and into the pooling container.

According to a further example and when the fluid transfer device is in the third configuration the first fluid channel is fluidically connectable or is fluidically connected to the third fluid channel to allow and/or to support a flow of fluid from the pooling container into the diluent container. Here, and compared to the second configuration the direction of flow can be inverted or redirected. When in the third configuration the fluid transfer device may be in a dosing mode. When in the third configuration an amount of the pooled and diluted medicament located in the pooling container can be withdrawn from the pooling container and can be directed and transferred into the diluent container.

Thereafter and when the diluent container is provided with a well-defined amount of a pharmaceutical substance from the pooling container, the diluent container can be used as an injection or infusion container. Hence, the diluent container and/or other content provided inside the diluent container can be directly used for injection and/or infusion.

According to a further example and when in the third configuration a flow of fluid from the diluent container into the pooling container is prevented.

When in one of the second configuration and the third configuration the flow of fluid between the second fluid channel and the third fluid channel may be induced or controlled by a pump device connected to the fourth fluid channel. Hence, in at least one of the second configuration and the third configuration there may be provided a fluid connection or fluid communication between the fourth fluid channel and at least one of the first fluid channel and the third fluid channel.

In some examples, and when in one of the second configuration or third configuration the fourth fluid channel may be fluidically connected to both, the first fluid channel and the third fluid channel. The fluid communication or fluid connection between the fourth fluid channel and at least one of the third fluid channel and the first fluid channel may be configured to support and/or to allow a unidirectional flow of fluid. In the second configuration the first fluid channel may be fluidically connected to the fourth fluid channel to support a flow of fluid from the first fluid channel to the fourth fluid channel and hence into the pump device connected to the fourth fluid channel. In the second configuration it may be also provided that the fourth fluid channel is fluidically connected to the third fluid channel to support a flow of fluid from the fourth fluid channel to the third and through the third fluid channel.

In the third configuration the flow of fluid between the first fluid channel, the third fluid channel and the fourth fluid channel may be inverted.

Here, a flow of fluid from the third fluid channel towards and into the fourth fluid channel is allowed and/or supported. Moreover, a flow of fluid from the fourth fluid channel towards and into the first fluid channel is allowed and/or supported, while a flow of fluid from the fourth fluid channel into the third fluid channel is blocker or prevented. Also, and when in the third configuration a flow of fluid from the first fluid channel into the fourth fluid channel is blocked or prevented.

According to a further example the fluid transfer device is transferable into one of the first configuration, the second configuration and/or the third configuration by moving the movable part into one of a first position, a second position and/or a third position relative to the body. Here, the fluid transfer device may be transferable into the first configuration by moving the movable part into the first position relative to the body. The fluid transfer device may be transferable into the second configuration by moving the fluid transfer device into the second position, and the fluid transfer device may be transferable into the third configuration by moving the movable part into the third position relative to the body.

The movement of the movable part relative to the body may be user-controlled or user-controllable. According to some examples the movable part may be in sliding engagement with the body of the fluid transfer device. Here, the movable part may be movable along a first direction to transfer the fluid transfer device from the first configuration into one of the second configuration and third configuration. When in the second configuration the movable part may be movable further along the first direction towards and into the third position to switch the fluid transfer device into the third configuration.

When the fluid transfer device is in the third configuration it may be transferable or switchable into one of the second configuration and the first configuration by moving the movable part relative to the body along a second direction, which is opposite to the first direction. When in the third position the movable part is movable along the second direction to move into the second position to thereby switch or transfer the fluid transfer device into the second configuration. When the movable part is in the second position it is further movable along the second direction into the first position to thereby switch or transfer the fluid transfer device into the first configuration.

According to some examples the fluid transfer device is transferable from the first configuration into the third configuration through the intermediate second configuration. Insofar, the fluid transfer device may be switchable from the first configuration, i.e., the pooling mode into the second configuration, i.e., the diluting mode, further into the third configuration, i.e., the dosing mode; and vice versa.

According to some examples the body may define a longitudinal direction and the movable part is movable along the longitudinal direction along the first direction and is further movable in an opposite direction, i.e., along the second longitudinal direction.

According to a further example the movable part comprises a first transfer channel with a first passageway, which is aligned and which is fluidically coupled with the second fluid channel and with the third fluid channel when the fluid transfer device is in the first configuration. The first transfer channel provides a flow connection between the second fluid channel and the third fluid channel when the movable part is in the first position and hence when the fluid transfer device is in the first configuration.

In this way and by arranging the movable part in the first position there is established a fluid communication and hence a fluid connection between the second fluid channel and the third fluid channel that allows a flow of fluid from the medicament container fluidically connected to the second fluid channel towards and into the pooling container connected to and fluidically communicating with the third fluid channel.

The flow of fluid from the medicament container towards and into the pooling container may be supported by gravity. Here and when in the first configuration a particular orientation of second and third connecting portions and hence a respective orientation or arrangement of second and third medicament containers connected to the second and third connecting portions, respectively, may be required or intended to enable a respective flow of fluid.

Here, and according to some examples the fluid transfer device may have to be oriented in a manner such that the second connecting portion is above the third connecting portion as seen in a vertical direction or as seen with respect to the direction of gravity.

According to some examples the first transfer channel may be implemented as a through channel or as a first passageway extending through the movable part. The through channel may be implemented as a through bore extending through the bulk of the movable part or through a body of the movable part.

According to a further example the movable part comprises a second transfer channel, which is aligned and which is fluidically coupled with the first fluid channel and with the third fluid channel when the fluid transfer device is in the second configuration. The second transfer channel is configured to allow and/or to support a flow of fluid from the first fluid channel into the third fluid channel when the fluid transfer device is in the second configuration.

The third fluid channel is in flow connection with the first fluid channel when the movable part is in the second position. The fluid communication of fluid connection between the third fluid channel and the first fluid channel is provided and established by the respective alignment of the second transfer channel. Also, the second transfer channel may extend through the movable part. It may be implemented as a through channel or as a through bore extending through the bulk or body of the movable part of the fluid transfer device.

By moving the movable part relative to the body of the fluid transfer device along the first direction when starting from the first position of the movable part, the first transfer channel may get out of alignment from at least one of the second fluid channel and the third fluid channel. When arriving or reaching the second position the second transfer channel of the movable part gets in in alignment with the first fluid channel and with the third fluid channel thereby establishing a respective flow communication or fluid connection between the first fluid channel and the third fluid channel.

According to a further example and when the fluid transfer device is in the second configuration, hence, when the movable part is in the second position, the second transfer channel is configured to prevent a flow of fluid from the third fluid channel into the first fluid channel. Hence, and when in the second configuration the fluid connection between the first fluid channel and the second fluid channel as provided by the second transfer channel is unidirectional. Here, the second transfer channel provides a flow of fluid from the first fluid channel towards and into the third fluid channel but prevents a flow of fluid in the opposite direction, i.e., from the third fluid channel into the first fluid channel. Here, it can be provided that only diluent located inside the diluent container can be transferred into the pooling container but as long as in the second configuration, a transfer of fluid from the pooling container into the diluent container is effectively prevented.

According to another example the second transfer channel comprises a second passageway comprising a distal end aligned with and fluidically coupled with the first fluid channel. The second passageway further comprises a proximal end aligned with and fluidically connectable with the fourth fluid channel when the fluid transfer device is in the second configuration. The second transfer channel further comprises a first branch section merging into the second passageway. The first branch section is further fluidically connectable or is fluidically connected with the third fluid channel when the fluid transfer device is in the second configuration.

Via the second passageway there can be additionally provided a fluid communication with the fourth fluid channel, which is configured for connection to a pump device. By way of the pump device there can be applied a positive and/or a negative pressure to the fourth fluid channel and hence to the second passageway.

In a suction mode, hence, when the pump device is used to apply a negative pressure to the fourth fluid channel, the respective negative pressure can be transferred into the second passageway and hence into the first fluid channel to withdraw an amount of diluent from the diluent container through the first fluid channel, through the second passageway into the fourth fluid channel and further into the pump device.

In an expelling mode, i.e., when using the pump device to expel the diluent into the fourth fluid channel the respective flow of fluid can be directed or redirected from the fourth fluid channel into the first branch section and hence into the third fluid channel and further into the pooling container connected to the third connecting portion and hence fluidically communicating with the third fluid channel.

According to some examples and in order to provide a respective direction of flow in a suction mode and in an expelling mode as induced by the pump device connected to the fourth fluid channel, the second passageway comprises a first check valve at the distal end. The second transfer channel may further comprise a second check valve in the first branch section. By way of first and second check valves a respective direction of flow can be defined or controlled in the case of application of negative pressure and positive pressure via the fourth fluid channel.

In a further example the first check valve is configured to allow a flow of fluid from the first fluid channel into the second passageway. The first check valve is further configured to prevent a flow of fluid from the second passageway back into the first fluid channel. In this way it can be effectively provided, that a diluent can be withdrawn from the diluent container towards and into the pump device when applying a negative pressure via the fourth fluid channel. But when applying a positive pressure and hence when expelling the diluent from the pump device back into the fourth fluid channel the respective flow of fluid cannot re-enter the first fluid channel but is redirected into the first branch section and hence towards and into the third fluid channel.

Accordingly, and in a further example the second check valve is configured to allow a flow of fluid from the first branch section into the third fluid channel. It is further configured to prevent a flow of fluid from the third fluid channel into the first branch section. Hence, the second check valve as arranged in the first branch section is oppositely oriented compared to the first check valve. Accordingly, and when in the second configuration a negative pressure as supplied or provided by the pump device via the fourth fluid channel may be transferred through the proximal end into the second passageway towards the distal end of the second passageway.

The first check valve may then open and may support and allow a flow of fluid from the first fluid channel into the distal end of the second passageway towards the proximal end of the second passageway into the fourth fluid channel and further into the pump device. The second check valve is and remains effectively closed and prevents an ingress of a fluid into the third fluid channel. Now and in an opposite mode of operation and when using the pump device to apply a positive pressure, e.g., when expelling an amount of a diluent from the pump device into the fourth fluid channel the first check valve is effectively closed and prevents a flow of fluid from the second passageway into the first fluid channel. Here, the second check valve opens and supports a flow of fluid from the proximal end of the second passageway into the branch section and further into the third fluid channel.

The respective procedure may be repeated multiple times. By applying a negative pressure by way of the pump device a respective amount of a diluent can be withdrawn from the diluent container into the pump device. In an expelling mode and hence by generating a positive pressure, the pump device can be used to expel the respective amount of the diluent into the pooling container.

According to a further example the movable part comprises a third transfer channel, which is aligned and fluidically coupled with the first fluid channel and with the third fluid channel and which is configured to allow a flow of fluid from the third fluid channel into the first fluid channel when the fluid transfer device is in the third configuration.

According to some examples the third transfer channel may be implemented in a similar or likewise manner as the second transfer channel but may support and allow a flow of fluid in an opposite sense compared to the second transfer channel.

Accordingly, and when the movable part is in the third position there is provided a respective alignment and a respective flow and fluid communication between the first fluid channel and the third fluid channel, which supports and provides a flow of fluid from the third fluid channel into the first fluid channel. Also here, there may be provided a respective flow or fluid connection with the fourth fluid channel, such that the respective flow of fluid from the third fluid channel into the first fluid channel can be induced or controlled by applying a negative and/or positive pressure by way of the pump device connected to the fourth fluid channel.

According to a further example the third transfer channel is configured to prevent a flow of fluid from the first fluid channel into the third fluid channel when the fluid transfer device is in the third configuration, hence when the movable part is in the third position. According to a further example the third transfer channel comprises a third passageway comprising a distal end aligned with and fluidically coupled with the first fluid channel. The third passageway further comprises a proximal end aligned with and fluidically connectable or fluidically connected with the fourth fluid channel when the fluid transfer device is in the third configuration, hence when the movable part is in the third position.

The third transfer channel further comprises a second branch section, which merges into the third passageway and which is fluidically connectable with the third fluid channel when the fluid transfer device is in the third configuration, hence, when the movable part is in the third position.

By way of the third passageway there can be provided a fluid communication to the pump device via the fourth fluid channel. The second branch section provides a respective flow or fluid communication between the third fluid channel and the third passageway.

In a manner similar to the second transfer channel the third transfer channel with its third passageway comprises a third check valve at the distal end of the third passageway. The third transfer channel further comprises a fourth check valve in the second branch section.

The third check valve may be implemented in an opposite sense compared to the first check valve. The fourth check valve may be implemented in an opposite sense or opposite direction compared to the second check valve. Hence, the mode of operation of the third passageway is opposite to the mode of operation and/or the flow of fluid as supported or allowed by the second passageway.

According to a further example the third check valve is configured to allow a flow of fluid from the third passageway into the first fluid channel. The third check valve is further configured to prevent a flow of fluid from the first fluid channel into the third passageway. Moreover, and according to another example the fourth check valve is configured to allow a flow of fluid from the third fluid channel into the second branch section. It is further configured to prevent a flow of fluid from the second branch section into the third fluid channel. In this way and when the fluid transfer device is in the third configuration a negative pressure as applied by the pump device to the fourth fluid channel is transferable into the third fluid channel to thereby withdraw an amount of a liquid from the pooling container towards and into the pump device. In an expelling mode, hence when expelling the fluid from the pump device into the fourth fluid channel the respective flow of fluid is redirected into the first fluid channel but is prevented to re-enter the third fluid channel.

In this way, the fluid transfer device can be operated in a dosing mode. Here, a medicament and/or a liquid substance, e.g., a diluted medicament located inside the pooling container, can be transferred from the pooling container into the pump device and further from the pump device into the diluent container.

According to a further example the fourth fluid channel is fluidically coupled with at least one of the first fluid channel and the third fluid channel when the fluid transfer device is in one of the second configuration and the third configuration. In some examples the fourth fluid channel may be fluidically coupled with both of the first fluid channel and the third fluid channel when the fluid transfer device is in one of the second configuration and the third configuration.

Since the second passageway and the third passageway can be selectively and alternatively get in fluid communication with the first fluid channel, the fourth fluid channel and the third fluid channel and since the second and third passageways support and allow opposite directions of a flow of fluid, the fluid transfer device can be switched between the pooling mode and the dosing mode by aligning the second passageway or third passageway with the respective fluid channels of the body of the fluid transfer device.

According to a further example and when in the second configuration the first fluid channel fluidically communicates with the fourth fluid channel to allow and/or to support a flow of fluid from the diluent container to the pump device. Moreover and when in the second configuration the third fluid channel fluidically communicates with the fourth fluid channel to allow and/or to support a flow of fluid from the pump device into the pooling container.

According to a further example and when in the third configuration the third fluid channel fluidically communicates with the fourth fluid channel to allow and/or to support a flow of fluid from the pooling container to the pump device. When in the third configuration the first channel also fluidically communicates with the fourth fluid channel to allow and/or to support a flow of fluid from the pump device into the diluent container.

In this way the fourth fluid channel connected to the pump device allows to control the transfer of fluid between the diluent container and the pooling container, which flow of fluid may be induced and/or controlled by a respective operation of the pump device, either in a suction mode or in an expelling mode.

According to a further example the body comprises a cavity, which is confined by a sidewall. The cavity and/or the sidewall define a longitudinal direction. Any one of the first fluid channel, the second fluid channel, the third fluid channel and the fourth fluid channel extend through the sidewall and merge into the cavity.

Any one of the first fluid channel, the second fluid channel, the third fluid channel and the fourth fluid channel may terminate in the cavity and may not extend or protrude into the interior of the cavity. Accordingly, the first fluid channel, the second fluid channel, the third fluid channel and the fourth fluid channel may extend outwardly from the sidewall. According to some examples the sidewall is a cylindrical sidewall and the cavity is a cylindrical or tubular cavity. Here, the first fluid channel, the second fluid channel, the third fluid channel and the fourth fluid channel may extend radially outwardly from the sidewall and hence from an inside surface of the sidewall into the body of the fluid transfer device.

In some examples at least one of the first fluid channel, the second fluid channel, the third fluid channel and the fourth fluid channel may protrude outwardly, e.g., radially outwardly from the sidewall and optionally also from the body of the fluid transfer device. The first fluid channel may be located diametrically opposite to the fourth fluid channel. The second fluid channel may be located diametrically opposite to the third fluid channel. Hence, the first fluid channel and the fourth fluid channel may merge from opposite directions into the cavity. The second fluid channel may extend diametrically opposite to the third fluid channel into the cavity.

According to some examples the first fluid channel, the second fluid channel, the third fluid channel and the fourth fluid channel may be arranged in a common plane or cross-section of the body or sidewall as seen in a longitudinal direction of the cavity or body.

The movable part may be movable in a longitudinal direction and hence perpendicular to the plane or cross-section in which the first fluid channel, the second fluid channel, the third fluid channel and the fourth fluid channel are located.

According to a further example the movable part comprises an insert portion, which is movably arranged inside the cavity. The insert portion may be in sliding or gliding engagement with the cavity of the body. In this way, the movable part may be movable relative to the body in a longitudinal direction and along the cavity of the body.

According to another example the sidewall comprises an inside surface, which is complementary shaped to an outside surface of the movable part. Specifically, the insert portion of the movable part, i.e., that a portion of the movable part, which is movably arranged inside the cavity, comprises an outside surface that is complementary shaped to the inside surface of the sidewall of the cavity or body of the fluid transfer device. With mutually corresponding inside and outside surfaces there can be provided a gliding or sliding engagement between the movable part and the cavity of the body of the fluid transfer device.

Hence, the outside surface of the movable part may be in gliding or sliding engagement with the inside surface of the sidewall of the cavity of the body of the fluid transfer device. In this way, there can be provided a well-defined gliding or sliding movement between the movable part and the body.

According to a further example the fluid transfer device is transferable between the first configuration, the second configuration and the third configuration by moving the movable part inside the cavity and in a longitudinal direction relative to the body.

Since the movable part is provided with a first passageway, the second passageway and the third passageway, by moving the movable part in a longitudinal direction relative to the body one of the respective passageways may align with the respective inside facing end of the first fluid channel, the second fluid channel, the third fluid channel and the fourth fluid channel, respectively.

According to a further example there may be provided at least one gasket on at least one of the outside surface of the movable part and the inside surface of the sidewall of the cavity of the body. The gasket may be provided on at least one of an outside end of the first passageway, the second passageway and the third passageway to provide a sealing engagement with the respective terminal ends of the fluid channels merging into the sidewall and hence merging into the cavity.

With other examples the terminal ends of the first fluid channel, the second fluid channel, the third fluid channel and the fourth fluid channel may be provided with a respective gasket so as to form or to establish a liquid tight and/or gas-tight flow communication between at least one of the first fluid channel, the second fluid channel, the third fluid channel, the fourth fluid channel and one of the first passageway, the second passageway and the third passageway in any of the first configuration, the second configuration and the third configuration of the fluid transfer device.

According to another aspect the present disclosure also relates to a kit, e.g., an infusion kit, and injection kit or preparation kit. The kit comprises a fluid transfer device as described above. The kit further comprises a diluent container connectable or connected to the first connecting portion of the fluid transfer device. The diluent container may fluidically communicate with the first fluid channel when connected to the first connecting portion of the fluid transfer device.

The kit further comprises a medicament container, which is connectable or which is connected to the second connecting portion of the fluid transfer device. The interior of the medicament container may be in fluid communication with the second fluid channel when the medicament container is connected to the second connecting portion of the fluid transfer device.

The kit further comprises a pooling container, which is connectable or which is connected to the third connecting portion of the fluid transfer device. When connected to the third connecting portion an interior of the pooling container is in fluid communication with the third fluid channel of the fluid transfer device.

The kit further comprises a pump device, which is connectable or which is connected to the fourth fluid channel of the fluid transfer device. When connected to the fourth fluid channel of the fluid transfer device the pump device is in fluid communication or flow communication with the fourth fluid channel. In some examples the pump device may be also integrated into the fluid transfer device. Here, the kit may only comprise a fluid transfer device including a pump device. The kit may then further comprise a diluent container, a medicament container and a pooling container connected or connectable to the respective first, second and third connecting portions of the fluid transfer device.

Since the kit comprises a fluid transfer device as described above, all features, effects and benefits as described above in connection with the fluid transfer device equally apply to the kit; and vice versa.

With the complete kit there can be provided a rather easy, intuitive, failure safe and reliable preparation of a liquid medicament for injection or infusion. Here, and after connecting the diluent container to the first connecting portion, after connecting the medicament container to the second connecting portion and after connecting the pooling container to the third connecting portion and further, with the pump device in flow communication with the fourth fluid channel, the fluid transfer device may be initially switched or transferred into a first configuration, in which a liquid medicament located in the medicament container is allowed to flow into the pooling container. Optionally, and after a respective transfer of the medicament from the medicament container into the pooling container the medicament container may be disconnected from the second connecting portion and another or numerous further medicament container may be connected to the second connecting portion so as to transfer a respective supplemental or additional medicament into the pooling container.

Thereafter, the fluid transfer device can be switched into the second configuration. Here and when in the second configuration the pump device can be used to induce or to control a transfer of a diluent from the diluent container into the pooling container. For this, the pump device may be used to apply a negative pressure and a positive pressure sequentially, thereby withdrawing an amount of the diluent from the diluent container into the pump device and thereafter expelling the respective amount of the diluent from the pump device into the pooling container. This step may be repeated multiple times to transfer a desired amount of diluent from the diluent container into the pooling container.

In the third configuration the direction of flow can be inverted compared to the second configuration. Here and after moving the movable part into the third position application of a negative pressure by the pump device may lead to a withdrawal of a liquid substance, e.g., of a diluted medicament from the pooling container into the pump device. By operating the pump device in an expelling mode, the respective medicament or liquid substance can be expelled from the pump device into the diluent container. Also these steps may be repeated multiple times thus allowing to transfer a predefined amount of a pharmaceutical substance from the pooling container into the diluent container, which thereafter could be used for injection or infusion.

In some examples the medicament container contains a lyophilized or dry-frozen medicament. The medicament container comprises a lyophilized medicament or drug inside the barrel.

In some examples the medicament container contains a liquid medicament that requires further dilution or mixing with a diluent. Here, a mixing or diluting may take place in any one of the medicament container and the diluent container. In some examples the liquid medicament may be transferred from the medicament container towards and into the diluent container. In other examples, the diluent or a portion of the diluent initially provided in the diluent container is transferred into the medicament container. Subsequently, the diluted medicament may be then re-transferred into the diluent container or into a separate administering container.

In general, the fluid transfer device and the methods as described herein can be used in connection with any three fluid containers. The fluid transfer device can be connected with its first connecting portion to a first container. It can be connected with its second connecting portion to a second container. It can be connected with its third connecting portion to a third container. A fluid initially located in one of the first container, the second container and the third container can be transferred into any other one of the first container, the second container and the third container. By switching or reconfiguring the fluid transfer device from the first configuration into one of the second or third configuration a fluid or a portion of the fluid that has been transferred between the first, second or third containers and hence into one of the first, second or third containers can be (re-)transferred into any other one of the first, second or third containers. Likewise, and by switching the fluid transfer device into the third configuration a further (re-)direction and transfer of a fluid into any one of the first, second or third containers can be provided.

In further examples it is even conceivable to mix multiple medicaments by transferring a liquid substance between any three containers connected to the first, to the second and third connecting portions of the fluid transfer device. It is even conceivable to connect numerous or several liquid containing containers or liquid receiving containers to one of the first connecting portion or second connecting portion of the fluid transfer device, e.g., by making use of a fluid guiding structure, such as an infusion line, e.g., provided with a least one valve, a switch or manifold.

According to a further aspect the present disclosure also relates to a method of transferring of a fluid between a diluent container, a medicament container and a pooling container. The method comprises the steps of using a fluid transfer device. The method further comprises the step of connecting a first connecting portion of the fluid transfer device to the diluent container. The method further comprises the step of connecting a second connecting portion of the fluid transfer device to the medicament container and connecting a third connecting portion of the fluid transfer device to the pooling container. Depending on whether the pump device is integrated into the fluid transfer device or not there may be conducted an optional step of connecting the pump device to the optional fourth connecting portion and hence to the fourth fluid channel of the fluid transfer device.

In other examples and when the fluid transfer device is provided with an integrated pump device such a separate step of connecting the pump device to the fourth fluid channel may be superfluous.

The method further comprises the step of transferring the fluid transfer device into a first configuration to thereby establish a fluid connection between the second connecting portion and the third connecting portion. After a respective switching or transferring of the fluid transfer device into the first configuration a medicament is transferred from the medicament container through the fluid connection into the pooling container.

According to some examples the second connecting portion is provided with a second fluid channel and the third connecting portion is provided with a third fluid channel. When in the first configuration the second fluid channel is fluidically connected to and fluidically communicates with the third fluid channel to thereby provide a respective fluid connection between the second and the third fluid channels and hence between the second and the third connecting portions of the fluid transfer device.

According to some examples the method is to be conducted with a fluid transfer device and/or with a kit as described above. Insofar, all features, effects and benefits as described above in connection with the fluid transfer device and/or in connection with the kit may equally apply to the method of transferring the fluid between the diluent container, the medicament container and the pooling container; and vice versa.

According to a further example of the method there is provided a step of disconnecting the medicament container from the second connecting portion and connecting a further medicament container to the second connecting portion. Thereafter, a further medicament from the further medicament container may be transferred through the fluid connection into the pooling container.

In this way there can be provided a pooling or collection of the content of numerous medicament containers inside the pooling container.

According to a further example the method further comprises the steps of transferring the fluid transfer device into a second configuration. Here, a negative pressure may be applied to the first fluid channel to induce a transfer of an amount of a fluid located in the diluent container through the first fluid channel and through the fourth fluid channel into the pump device. There may be further applied a step of expelling at least a portion of the amount of the fluid through the fourth fluid channel and through the third fluid channel into the pooling container. Expelling may be provided by the pump device. Here, the diluent previously transferred into the pump device may be expelled by the pump device into the fourth fluid channel and further through the third fluid channel into the pooling container. Also here, the steps of applying a negative pressure to the first fluid channel and subsequently expelling an amount of fluid through the fourth fluid channel towards and into the third fluid channel may be repeated multiple times so as to increase and/or to control the amount of diluent transferred from the diluent container into the pooling container.

According to a further example the method may further include a step of transferring the fluid transfer device into a third configuration. When in the third configuration there may be applied a negative pressure to the third fluid channel to induce a transfer of an amount of a fluid located in the pooling container through the third fluid channel and through the fourth fluid channel into the pump device. In a further step at least a portion of the amount of the fluid, e.g., now located in the pump device, may be expelled through the fourth fluid channel and through the first fluid channel into the diluent container.

The steps of applying a negative pressure and expelling an amount of the fluid from the pump device towards and into the first fluid channel may be repeated multiple times so as to control and/or to increase the amount of a pharmaceutical substance transferred from the pooling container into the diluent container. In this way, a proper dosing of a pharmaceutical substance into a diluent container can be provided. The diluent container provided with the pharmaceutical substance may be then directly used for infusion or injection.

According to another aspect the present disclosure also relates to a method of administering an injectable medicament. The method comprises the steps of preparing the injectable medicament by transferring a fluid between a diluent container, a medicament container and a pooling container by using a fluid transfer device. Here, the fluid transfer device comprises a body. The body comprises a first connecting portion, a second connecting portion and a third connecting portion. The first connecting portion is configured to connect to the diluent container. The first connecting portion comprises a first fluid channel to fluidically communicate with an interior of the diluent container. The second connecting portion is configured to connect to the medicament container. The second connecting portion comprises a second fluid channel to fluidically communicate with an interior of the medicament container. The third connecting portion is configured to connect to the pooling container. The third connecting portion comprises a third fluid channel to fluidically communicate with an interior of the pooling container.

The body of the fluid transfer device further comprises a fourth fluid channel to fluidically communicate with a pump device. The fluid transfer device also comprises a movable part, which is engaged with the body and which is movable relative to the body to transfer the fluid transfer device into one of a first configuration, a second configuration and a third configuration. When in the first configuration the second fluid channel is fluidically coupled to the third fluid channel to allow and/or to support a flow of fluid from the medicament container into the pooling container. When in the second configuration the first fluid channel is fluidically connectable or is fluidically coupled to the third fluid channel to allow and/or to support a flow of fluid from the diluent container into the pooling container, while blocking or preventing a flow of fluid from one of the third and the fourth fluid channels into the first fluid channel.

Moreover, and when in the third configuration the first fluid channel is fluidically connectable or is fluidically connected to the third fluid channel to allow and/or to support a flow of fluid from the pooling container into the diluent container, while blocking or preventing a flow of fluid from one of the first and the fourth fluid channels into the third fluid channel.

The method of administering the injectable medicament makes use of a fluid transfer device as described above. Insofar, all features, effects and benefits as described above in connection with the fluid transfer device equally apply to the method of administering the injectable medicament; and vice versa verse.

Further aspects of the fluid transfer device, the kit and the methods of transferring a fluid between a diluent container, a medicament container and a poling container will become apparent from the following clauses and their mutual dependencies:

Clause 1: A fluid transfer device (1) for transferring a fluid between a diluent container (100), a medicament container (200) and a pooling container (300), the fluid transfer device (1) comprising:

- a body (5), the body (5) comprising:
  - a first connecting portion (11) to connect to the diluent container (100), the first connecting portion (11) comprising a first fluid channel (10) to fluidically communicate with an interior (102) of the diluent container (100),
  - a second connecting portion (21) to connect to the medicament container (200), the second connecting portion (21) comprising a second fluid channel (20) to fluidically communicate with an interior (202) of the medicament container (200),
  - a third connecting portion (31) to connect to the pooling container (300), the third connecting portion (31)

comprising a third fluid channel (30) to fluidically communicate with an interior (302) of the pooling container (300), a fourth fluid channel (40) to fluidically communicate with a pump device (400), a movable part (60) engaged with the body (5) and movable relative to the body (5) to transfer the fluid transfer device (1) into one of a first configuration, a second configuration and a third configuration, wherein when in the first configuration the second fluid channel (20) is fluidically coupled to the third fluid channel (30) to allow a flow of fluid from the medicament container (200) into the pooling container (300), and wherein when in the second configuration the first fluid channel (10) is fluidically connectable to the third fluid channel (30) to allow a flow of fluid from the diluent container (100) into the pooling container (300).

Clause 2: The fluid transfer device (1) according to clause 1, wherein when in the second configuration, a flow of fluid from the pooling container (300) into the diluent container (100) is prevented.

Clause 2: The fluid transfer device (1) according to clause 1 or 2, wherein when in the third configuration the second fluid channel (20) is fluidically connectable to the third fluid channel (30) to allow a flow of fluid from the pooling container (300) into the diluent container (100).

Clause 4: The fluid transfer device (1) according to any one of the preceding clauses, wherein when in the third configuration, a flow of fluid from the diluent container (100) into the pooling container (300) is prevented.

Clause 5: The fluid transfer device (1) according to any one of the preceding clauses, wherein the fluid transfer device (1) is transferable into one of the first configuration, the second configuration and/or the third configuration by moving the movable part (60) into one of a first position, a second position and/or a third position relative to the body (5).

Clause 6: The fluid transfer device (1) according to any one of the preceding clauses, wherein the movable part (60) comprises a first transfer channel (70) with a first passageway (71), which is aligned and fluidically coupled with the second fluid channel (20) and with the third fluid channel (30) when the fluid transfer device (1) is in the first configuration.

Clause 7: The fluid transfer device (1) according to any one of the preceding clauses, wherein the movable part (60) comprises a second transfer channel (80), which is aligned and fluidically coupled with the first fluid channel (10) and with the third fluid channel (30) and which is configured to allow a flow of fluid from the first fluid channel (10) into the third fluid channel (30) when the fluid transfer device (1) is in the second configuration.

Clause 8: The fluid transfer device (1) according to clause 7, wherein the second transfer channel (80) is configured to prevent a flow of fluid from the third fluid channel (30) into the first fluid channel (10) when the fluid transfer device (1) is in the second configuration.

Clause 9: The fluid transfer device (1) according to clause 7 or 8, wherein the second transfer channel (80) comprises:

a second passageway (81) comprising a distal end (82) aligned with and fluidically coupled with the first fluid channel (10), and a proximal end (83) aligned with and fluidically connectable with the fourth fluid channel (40), when the fluid transfer device (1) is in the second configuration, and a first branch section (85) merging into the second passageway (81) and fluidically connectable with the third fluid channel (30) when the fluid transfer device (1) is in the second configuration.

Clause 10: The fluid transfer device (1) according to claim 9, wherein the second passageway (81) comprises a first check valve (84) at the distal end (82) and a second check valve (86) in the first branch section (85).

Clause 11: The fluid transfer device (1) according to clause 10, wherein the first check valve (84) is configured to allow a flow of fluid from the first fluid channel (10) into the second passageway (81) and wherein the first check valve (84) is configured to prevent a flow of fluid from the second passageway (81) into the first fluid channel (10).

Clause 12: The fluid transfer device (1) according to clause 10 or 11, wherein the second check valve (86) is configured to allow a flow of fluid from the first branch section (85) into the third fluid channel (30) and is configured to prevent a flow of fluid from the third fluid channel (30) into the first branch section (85).

Clause 13: The fluid transfer device (1) according to any one of the preceding clauses, wherein the movable part (60) comprises a third transfer channel (90), which is aligned and fluidically coupled with the first fluid channel (10) and with the third fluid channel (30) and which is configured to allow a flow of fluid from the third fluid channel (30) into the first fluid channel (10) when the fluid transfer device (1) is in the third configuration.

Clause 14: The fluid transfer device (1) according to clause 13, wherein the third transfer channel (90) is configured to prevent a flow of fluid from the first fluid channel (10) into the third fluid channel (30), when the fluid transfer device (1) is in the third configuration.

Clause 15: The fluid transfer device (1) according to clause 13 or 14, wherein the third transfer channel (90) comprises:

a third passageway (91) comprising a distal end (92) aligned with and fluidically coupled with the first fluid channel (10), and a proximal end (93) aligned with and fluidically connectable with the fourth fluid channel (40) when the fluid transfer device (1) is in the third configuration, and a second branch section (95) merging into the third passageway (91) and fluidically connectable with the third fluid channel (30) when the fluid transfer device (1) is in the third configuration.

Clause 16: The fluid transfer device (1) according to clause 15, wherein the third passageway (91) comprises a third check valve (94) at the distal end (92) and a fourth check valve (96) in the second branch section (95).

Clause 17: The fluid transfer device (1) according to clause 16, wherein the third check valve (94) is configured to allow a flow of fluid from the third passageway (91) into the first fluid channel (10) and wherein the third check valve (94) is configured to prevent a flow of fluid from the first fluid channel (10) into the third passageway (91).

Clause 18: The fluid transfer device (1) according to clause 16 or 17, wherein the fourth check valve (96) is configured to allow a flow of fluid from the third fluid channel (30) into the second branch section (95) and is configured to prevent a flow of fluid from the second branch section (95) into the third fluid channel (30).

Clause 19: The fluid transfer device (1) according to any one of the preceding clauses, wherein the fourth fluid channel (40) is fluidically coupled with at least one of the first fluid channel (10) and the third fluid channel (30) when the fluid transfer device (1) is in one of the second configuration and the third configuration.

Clause 20: The fluid transfer device (1) according any one of the preceding clauses, wherein when in the second configuration:

the first fluid channel (10) fluidically communicates with the fourth fluid channel (40) to allow a flow of fluid from the diluent container (100) to the pump device (400), and the third fluid channel (30) fluidically communicates with the fourth fluid channel (40) to allow a flow of fluid from the pump device (400) into the pooling container (300).

Clause 21: The fluid transfer device (1) according to any one of the preceding clauses, wherein when in the third configuration:

the third fluid channel (30) fluidically communicates with the fourth fluid channel (40) to allow a flow of fluid from the pooling container (300) to the pump device (400), and the first fluid channel (10) fluidically communicates with the fourth fluid channel (40) to allow a flow of fluid from the pump device (400) into the diluent container (100).

Clause 22: The fluid transfer device (1) according to any one of the preceding clauses, wherein the body (5) comprises a cavity (50) confined by a sidewall (51) and defining a longitudinal direction (2, 3) and wherein any one of the first fluid channel (10), the second fluid channel (20), the third fluid channel (30) and the fourth fluid channel (40) extend through the sidewall (51) and merge into the cavity (50).

Clause 23: The fluid transfer device (1) according to clause 22, wherein the movable part (60) comprises an insert portion (68), which is movably arranged inside the cavity (50).

Clause 24: The fluid transfer device (1) according to clause 22 or 23, wherein the sidewall (51) comprises an inside surface (52), which is complementary shaped to an outside surface (65) of the movable part (60).

Clause 25: The fluid transfer device (1) according to any one of the preceding clauses 22 to 24, wherein the fluid transfer device (1) is transferable between the first configuration, the second configuration and the third configuration by moving the movable part (60) inside the cavity (50) in the longitudinal direction (2, 3) relative to the body (5).

Clause 26: A kit comprising:

a fluid transfer device (1) according to any one of the preceding clauses, a diluent container (100) connectable or connected to the first connecting portion (11) of the fluid transfer device (1), a medicament container (200) connectable or connected to the second connecting portion (21) of the fluid transfer device (1), a pooling container (300) connectable or connected to the third connecting portion (31) of the fluid transfer device (1), and a pump device (400) connectable or connected to the fourth fluid channel (40) of the fluid transfer device (1).

Clause 27. A method of transferring of a fluid between a diluent container (100), a medicament container (200) and a pooling container (300), the method comprising the steps of:

using a fluid transfer device (1), connecting a first connecting portion (11) of the fluid transfer device (1) to the diluent container (100), connecting a second connecting portion (21) of the fluid transfer device (1) to the medicament container (200), connecting a third connecting portion (31) of the fluid transfer device (1) to the pooling container (300), transferring the fluid transfer device (1) into a first configuration to thereby establish a fluid connection between the second connecting portion (21) and the third connecting portion (31) and transferring a medicament from the medicament container (200) through the fluid connection into the pooling container (300).

Clause 28: The method according to clause 27, further comprising the steps of:

disconnecting the medicament container (200) from the second connecting portion (21), connecting a further medicament container (200) to the second connecting portion (21), and transferring a further medicament from the further medicament container (200) through the fluid connection into the pooling container (300).

Clause 29: The method of clause 27 or 28, further comprising the steps of:

transferring the fluid transfer device (1) into a second configuration, applying a negative pressure to the first fluid channel (10) to induce a transfer of an amount of a fluid located in the diluent container (100) through the first fluid channel (10) and through the fourth fluid channel (40) into the pump device (400), and expelling at least a portion of the amount of the fluid through the fourth fluid channel (40) through the third fluid channel (30) and into the pooling container (300).

Clause 30: The method of any one of the preceding clauses 27 to 29, further comprising the steps of:

transferring the fluid transfer device (1) into a third configuration, applying a negative pressure to the third fluid channel (30) to induce a transfer of an amount of a fluid located in the pooling container (300) through the third fluid channel (30) and through the fourth fluid channel (40) into the pump device (400), and expelling at least a portion of the amount of the fluid through the fourth fluid channel (40) through the first fluid channel (10) and into the diluent container (100).

Clause 31: The method of any one of the preceding clauses, wherein using the fluid transfer device (1) comprises using of a fluid transfer device (1) according to any one of the preceding clauses 1 to 25.

Clause 32: A method of administering an injectable medicament, the method comprising the steps of preparing the injectable medicament by transferring a fluid between a diluent container (100), a medicament container (200) and a pooling container (300) by using a fluid transfer device (1), wherein the fluid transfer device (1) comprises:

a body (5), the body (5) comprising:

a first connecting portion (11) to connect to the diluent container (100), the first connecting portion (11) comprising a first fluid channel (10) to fluidically communicate with an interior (102) of the diluent container (100), a second connecting portion (21) to connect to the medicament container (200), the second connecting portion (21) comprising a second fluid channel (20) to fluidically communicate with an interior (202) of the medicament container (200), a third connecting portion (31) to connect to the pooling container (300), the third connecting portion (31)

comprising a third fluid channel (30) to fluidically communicate with an interior (302) of the pooling container (300), a fourth fluid channel (40) to fluidically communicate with a pump device (400), a movable part (60) engaged with the body (5) and movable relative to the body (5) to transfer the fluid transfer device (1) into one of a first configuration, a second configuration and a third configuration, wherein when in the first configuration the second fluid channel (20) is fluidically coupled to the third fluid channel (30) to allow a flow of fluid from the medicament container (200) into the pooling container (300), and wherein when in the second configuration the first fluid channel (10) is fluidically connectable to the third fluid channel (30) to allow a flow of fluid from the diluent container (100) into the pooling container (300).

The terms "drug" or "medicament" are used synonymously herein and describe a pharmaceutical formulation containing one or more active pharmaceutical ingredients or pharmaceutically acceptable salts or solvates thereof, and optionally a pharmaceutically acceptable carrier. An active pharmaceutical ingredient ("API"), in the broadest terms, is a chemical structure that has a biological effect on humans or animals. In pharmacology, a drug or medicament is used in the treatment, cure, prevention, or diagnosis of disease or used to otherwise enhance physical or mental well-being. A drug or medicament may be used for a limited duration, or on a regular basis for chronic disorders.

As described below, a drug or medicament can include at least one API, or combinations thereof, in various types of formulations, for the treatment of one or more diseases. Examples of API may include small molecules having a molecular weight of 500 Da or less; polypeptides, peptides and proteins (e.g., hormones, growth factors, antibodies, antibody fragments, and enzymes); carbohydrates and polysaccharides; and nucleic acids, double or single stranded DNA (including naked and cDNA), RNA, antisense nucleic acids such as antisense DNA and RNA, small interfering RNA (siRNA), ribozymes, genes, and oligonucleotides. Nucleic acids may be incorporated into molecular delivery systems such as vectors, plasmids, or liposomes. Mixtures of one or more drugs are also contemplated.

The drug or medicament may be contained in a primary package or "drug container" adapted for use with a drug delivery device. The drug container may be, e.g., a cartridge, syringe, reservoir, or other solid or flexible vessel configured to provide a suitable chamber for storage (e.g., short- or long-term storage) of one or more drugs. For example, in some instances, the chamber may be designed to store a drug for at least one day (e.g., 1 to at least 30 days). In some instances, the chamber may be designed to store a drug for about 1 month to about 2 years. Storage may occur at room temperature (e.g., about 20° C.), or refrigerated temperatures (e.g., from about −4° C. to about 4° C.). In some instances, the drug container may be or may include a dual-chamber cartridge configured to store two or more components of the pharmaceutical formulation to-be-administered (e.g., an API and a diluent, or two different drugs) separately, one in each chamber. In such instances, the two chambers of the dual-chamber cartridge may be configured to allow mixing between the two or more components prior to and/or during dispensing into the human or animal body. For example, the two chambers may be configured such that they are in fluid communication with each other (e.g., by way of a conduit between the two chambers) and allow mixing of the two components when desired by a user prior to dispensing. Alternatively or in addition, the two chambers may be configured to allow mixing as the components are being dispensed into the human or animal body.

The drugs or medicaments contained in the drug delivery devices as described herein can be used for the treatment and/or prophylaxis of many different types of medical disorders. Examples of disorders include, e.g., diabetes mellitus or complications associated with diabetes mellitus such as diabetic retinopathy, thromboembolism disorders such as deep vein or pulmonary thromboembolism. Further examples of disorders are acute coronary syndrome (ACS), angina, myocardial infarction, cancer, macular degeneration, inflammation, hay fever, atherosclerosis and/or rheumatoid arthritis. Examples of APIs and drugs are those as described in handbooks such as Rote Liste 2014, for example, without limitation, main groups 12 (anti-diabetic drugs) or 86 (oncology drugs), and Merck Index, 15th edition.

Examples of APIs for the treatment and/or prophylaxis of type 1 or type 2 diabetes mellitus or complications associated with type 1 or type 2 diabetes mellitus include an insulin, e.g., human insulin, or a human insulin analogue or derivative, a glucagon-like peptide (GLP-1), GLP-1 analogues or GLP-1 receptor agonists, or an analogue or derivative thereof, a dipeptidyl peptidase-4 (DPP4) inhibitor, or a pharmaceutically acceptable salt or solvate thereof, or any mixture thereof. As used herein, the terms "analogue" and "derivative" refers to a polypeptide which has a molecular structure which formally can be derived from the structure of a naturally occurring peptide, for example that of human insulin, by deleting and/or exchanging at least one amino acid residue occurring in the naturally occurring peptide and/or by adding at least one amino acid residue. The added and/or exchanged amino acid residue can either be codable amino acid residues or other naturally occurring residues or purely synthetic amino acid residues. Insulin analogues are also referred to as "insulin receptor ligands". In particular, the term "derivative" refers to a polypeptide which has a molecular structure which formally can be derived from the structure of a naturally occurring peptide, for example that of human insulin, in which one or more organic substituent (e.g., a fatty acid) is bound to one or more of the amino acids. Optionally, one or more amino acids occurring in the naturally occurring peptide may have been deleted and/or replaced by other amino acids, including non-codeable amino acids, or amino acids, including non-codeable, have been added to the naturally occurring peptide.

Examples of insulin analogues are Gly(A21), Arg(B31), Arg(B32) human insulin (insulin glargine); Lys(B3), Glu (B29) human insulin (insulin glulisine); Lys(B28), Pro(B29) human insulin (insulin lispro); Asp(B28) human insulin (insulin aspart); human insulin, wherein proline in position B28 is replaced by Asp, Lys, Leu, Val or Ala and wherein in position B29 Lys may be replaced by Pro; Ala(B26) human insulin; Des(B28-B30) human insulin; Des(B27) human insulin and Des(B30) human insulin.

Examples of insulin derivatives are, for example, B29-N-myristoyl-des(B30) human insulin, Lys(B29) (N-tetradecanoyl)-des(B30) human insulin (insulin detemir, Levemir®); B29-N-palmitoyl-des(B30) human insulin; B29-N-myristoyl human insulin; B29-N-palmitoyl human insulin; B28-N-myristoyl LysB28ProB29 human insulin; B28-N-palmitoyl-LysB28ProB29 human insulin; B30-N-myristoyl-ThrB29LysB30 human insulin; B30-N-palmitoyl-ThrB29LysB30 human insulin; B29-N—(N-palmitoyl-gamma-glutamyl)-des(B30) human insulin, B29-N-omega-carboxypentadecanoyl-gamma-L-glutamyl-des(B30)

human insulin (insulin degludec, Tresiba®); B29-N—(N-lithocholyl-gamma-glutamyl)-des(B30) human insulin; B29-N-(ω-carboxyheptadecanoyl)-des(B30) human insulin and B29-N-(ω-carboxyheptadecanoyl) human insulin.

Examples of GLP-1, GLP-1 analogues and GLP-1 receptor agonists are, for example, Lixisenatide (Lyxumia®), Exenatide (Exendin-4, Byetta®, Bydureon®, a 39 amino acid peptide which is produced by the salivary glands of the Gila monster), Liraglutide (Victoza®), Semaglutide, Taspoglutide, Albiglutide (Syncria®), Dulaglutide (Trulicity®), rExendin-4, CJC-1134-PC, PB-1023, TTP-054, Langlenatide/HM-11260C (Efpeglenatide), HM-15211, CM-3, GLP-1 Eligen, ORMD-0901, NN-9423, NN-9709, NN-9924, NN-9926, NN-9927, Nodexen, Viador-GLP-1, CVX-096, ZYOG-1, ZYD-1, GSK-2374697, DA-3091, MAR-701, MAR709, ZP-2929, ZP-3022, ZP-DI-70, TT-401 (Pegapamodtide), BHM-034. MOD-6030, CAM-2036, DA-15864, ARI-2651, ARI-2255, Tirzepatide (LY3298176), Bamadutide (SAR425899), Exenatide-XTEN and Glucagon-Xten.

An example of an oligonucleotide is, for example: mipomersen sodium (Kynamro®), a cholesterol-reducing antisense therapeutic for the treatment of familial hypercholesterolemia or RG012 for the treatment of Alport syndrome.

Examples of DPP4 inhibitors are Linagliptin, Vildagliptin, Sitagliptin, Denagliptin, Saxagliptin, Berberine.

Examples of hormones include hypophysis hormones or hypothalamus hormones or regulatory active peptides and their antagonists, such as Gonadotropine (Follitropin, Lutropin, Choriongonadotropin, Menotropin), Somatropine (Somatropin), Desmopressin, Terlipressin, Gonadorelin, Triptorelin, Leuprorelin, Buserelin, Nafarelin, and Goserelin.

Examples of polysaccharides include a glucosaminoglycane, a hyaluronic acid, a heparin, a low molecular weight heparin or an ultra-low molecular weight heparin or a derivative thereof, or a sulphated polysaccharide, e.g., a poly-sulphated form of the above-mentioned polysaccharides, and/or a pharmaceutically acceptable salt thereof. An example of a pharmaceutically acceptable salt of a poly-sulphated low molecular weight heparin is enoxaparin sodium. An example of a hyaluronic acid derivative is Hylan G-F 20 (Synvisc®), a sodium hyaluronate.

The term "antibody", as used herein, refers to an immunoglobulin molecule or an antigen-binding portion thereof. Examples of antigen-binding portions of immunoglobulin molecules include F(ab) and $F(ab')_2$ fragments, which retain the ability to bind antigen. The antibody can be polyclonal, monoclonal, recombinant, chimeric, de-immunized or humanized, fully human, non-human, (e.g., murine), or single chain antibody. In some embodiments, the antibody has effector function and can fix complement. In some embodiments, the antibody has reduced or no ability to bind an Fc receptor. For example, the antibody can be an isotype or subtype, an antibody fragment or mutant, which does not support binding to an Fc receptor, e.g., it has a mutagenized or deleted Fc receptor binding region. The term antibody also includes an antigen-binding molecule based on tetravalent bispecific tandem immunoglobulins (TBTI) and/or a dual variable region antibody-like binding protein having cross-over binding region orientation (CODV).

The terms "fragment" or "antibody fragment" refer to a polypeptide derived from an antibody polypeptide molecule (e.g., an antibody heavy and/or light chain polypeptide) that does not comprise a full-length antibody polypeptide, but that still comprises at least a portion of a full-length antibody polypeptide that is capable of binding to an antigen. Antibody fragments can comprise a cleaved portion of a full length antibody polypeptide, although the term is not limited to such cleaved fragments. Antibody fragments that are useful in the present invention include, for example, Fab fragments, $F(ab')_2$ fragments, scFv (single-chain Fv) fragments, linear antibodies, monospecific or multispecific antibody fragments such as bispecific, trispecific, tetraspecific and multispecific antibodies (e.g., diabodies, triabodies, tetrabodies), monovalent or multivalent antibody fragments such as bivalent, trivalent, tetravalent and multivalent antibodies, minibodies, chelating recombinant antibodies, tribodies or bibodies, intrabodies, small modular immunopharmaceuticals (SMIP), binding-domain immunoglobulin fusion proteins, camelized antibodies, and immunoglobulin single variable domains. Additional examples of antigen-binding antibody fragments are known in the art.

The term "immunoglobulin single variable domain" (ISV), interchangeably used with "single variable domain", defines immunoglobulin molecules wherein the antigen binding site is present on, and formed by, a single immunoglobulin domain. As such, immunoglobulin single variable domains are capable of specifically binding to an epitope of the antigen without pairing with an additional immunoglobulin variable domain. The binding site of an immunoglobulin single variable domain is formed by a single heavy chain variable domain (VH domain or VHH domain) or a single light chain variable domain (VL domain). Hence, the antigen binding site of an immunoglobulin single variable domain is formed by no more than three CDRs.

An immunoglobulin single variable domain (ISV) can be a heavy chain ISV, such as a VH (derived from a conventional four-chain antibody), or VHH (derived from a heavy-chain antibody), including a camelized VH or humanized VHH. For example, the immunoglobulin single variable domain may be a (single) domain antibody, a "dAb" or dAb or a Nanobody® ISV (such as a VHH, including a humanized VHH or camelized VH) or a suitable fragment thereof. [Note: Nanobody® is a registered trademark of Ablynx N.V.]; other single variable domains, or any suitable fragment of any one thereof.

"VHH domains", also known as VHHs, VHH antibody fragments, and VHH antibodies, have originally been described as the antigen binding immunoglobulin variable domain of "heavy chain antibodies" (i.e., of "antibodies devoid of light chains"; Hamers-Casterman et al. 1993 (Nature 363: 446-448). The term "VHH domain" has been chosen in order to distinguish these variable domains from the heavy chain variable domains that are present in conventional 4-chain antibodies (which are referred to herein as "VH domains") and from the light chain variable domains that are present in conventional 4-chain antibodies (which are referred to herein as "VL domains"). For a further description of VHH's, reference is made to the review article by Muyldermans 2001 (Reviews in Molecular Biotechnology 74: 277-302).

For the term "dAb's" and "domain antibody", reference is for example made to Ward et al. 1989 (Nature 341: 544), to Holt et al. 2003 (Trends Biotechnol. 21: 484); as well as to WO 2004/058820, WO 2006/030220, WO 2006/003388. It should also be noted that, although less preferred in the context of the present invention because they are not of mammalian origin, single variable domains can be derived from certain species of shark (for example, the so-called "IgNAR domains", see for example WO 2005/18629).

The terms "Complementarity-determining region" or "CDR" refer to short polypeptide sequences within the variable region of both heavy and light chain polypeptides that are primarily responsible for mediating specific antigen recognition. The term "framework region" refers to amino acid sequences within the variable region of both heavy and light chain polypeptides that are not CDR sequences, and are primarily responsible for maintaining correct positioning of the CDR sequences to permit antigen binding. Although the framework regions themselves typically do not directly participate in antigen binding, as is known in the art, certain residues within the framework regions of certain antibodies can directly participate in antigen binding or can affect the ability of one or more amino acids in CDRs to interact with antigen.

Examples of antibodies are anti PCSK-9 mAb (e.g., Alirocumab), anti IL-6 mAb (e.g., Sarilumab), and anti IL-4 mAb (e.g., Dupilumab).

Pharmaceutically acceptable salts of any API described herein are also contemplated for use in a drug or medicament in a drug delivery device. Pharmaceutically acceptable salts are for example acid addition salts and basic salts.

Those of skill in the art will understand that modifications (additions and/or removals) of various components of the APIs, formulations, apparatuses, methods, systems and embodiments described herein may be made without departing from the full scope and spirit of the present invention, which encompass such modifications and any and all equivalents thereof.

An example drug delivery device may involve a needle-based injection system as described in Table 1 of section 5.2 of ISO 11608-1:2014(E). As described in ISO 11608-1:2014 (E), needle-based injection systems may be broadly distinguished into multi-dose container systems and single-dose (with partial or full evacuation) container systems. The container may be a replaceable container or an integrated non-replaceable container.

As further described in ISO 11608-1:2014(E), a multi-dose container system may involve a needle-based injection device with a replaceable container. In such a system, each container holds multiple doses, the size of which may be fixed or variable (pre-set by the user). Another multi-dose container system may involve a needle-based injection device with an integrated non-replaceable container. In such a system, each container holds multiple doses, the size of which may be fixed or variable (pre-set by the user).

As further described in ISO 11608-1:2014(E), a single-dose container system may involve a needle-based injection device with a replaceable container. In one example for such a system, each container holds a single dose, whereby the entire deliverable volume is expelled (full evacuation). In a further example, each container holds a single dose, whereby a portion of the deliverable volume is expelled (partial evacuation). As also described in ISO 11608-1:2014 (E), a single-dose container system may involve a needle-based injection device with an integrated non-replaceable container. In one example for such a system, each container holds a single dose, whereby the entire deliverable volume is expelled (full evacuation). In a further example, each container holds a single dose, whereby a portion of the deliverable volume is expelled (partial evacuation).

BRIEF DESCRIPTION OF THE FIGURES

In the following, an example of the fluid transfer device and a kit comprising such a fluid transfer device to provide a fluid transfer between a diluent container, a medicament container, and a pump device will become apparent in greater detail by making reference to the drawings, in which.

DETAILED DESCRIPTION

Figure 1:
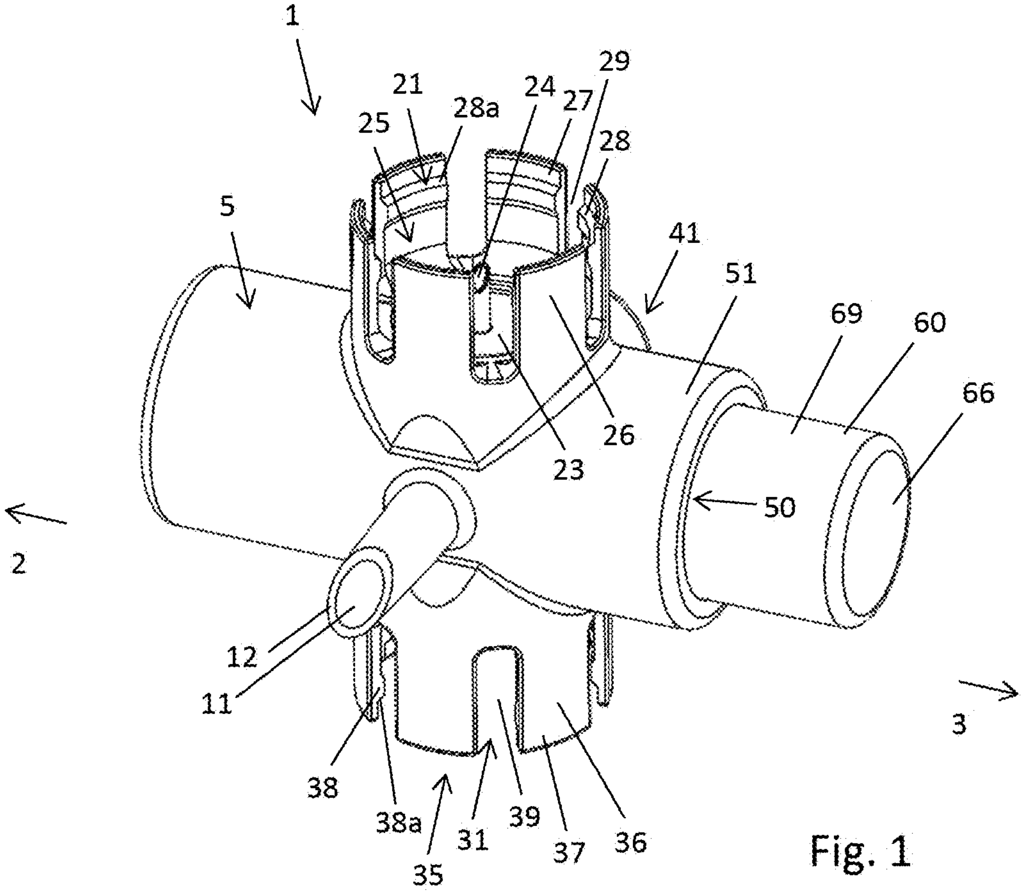
FIG. 1 is a perspective illustration of an example fluid transfer device.
Figure 2:
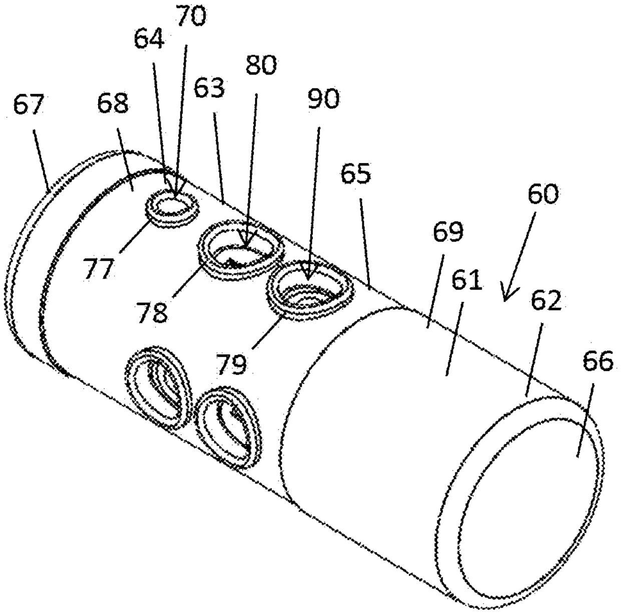
FIG. 2 is an isolated perspective view of a movable part of the fluid transfer device of FIG. 1.
Figure 3:
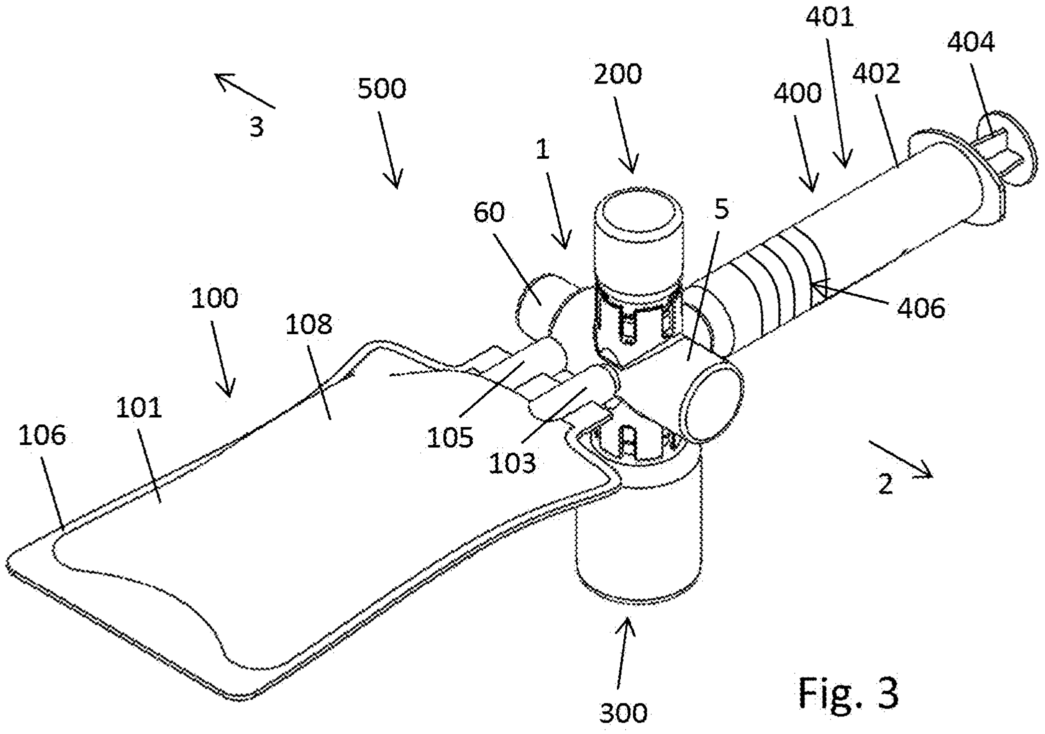
FIG. 3 is a perspective illustration of a kit including the fluid transfer device of FIG. 1, a diluent container, a medicament container, a pooling container, and a pump device.

FIGS. 1-10 illustrate an example of a fluid transfer device 1, which may form part of an infusion or injection kit 500 as illustrated in FIG. 3. The fluid transfer device 1 comprises a body 5 with a first connecting portion 11 to connect to a diluent container 100. The first connecting portion 11 comprises a first fluid channel 10 to fluidically communicate with an interior 102 of the diluent container 100. The fluid transfer device 1 further comprises a second connecting portion 21 to connect to a medicament container 200. The second connecting portion 21 comprises a second fluid channel 20 to fluidically communicate with an interior 202 of the medicament container 200. The fluid transfer device 1 further comprises a third connecting portion 31 to connect to a pooling container 300. The third connecting portion 31 comprises a third fluid channel 30 to fluidically communicate with an interior 302 of the pooling container 300.

In the example of FIGS. 1-9 the fluid transfer device 1 comprises a fourth connecting portion 41, which is configured for connecting to a pump device 400. The pump device 400 may comprise a syringe 401 with a syringe barrel 402 and a plunger 404 longitudinally displaceable inside the syringe barrel 402.

Figure 10:
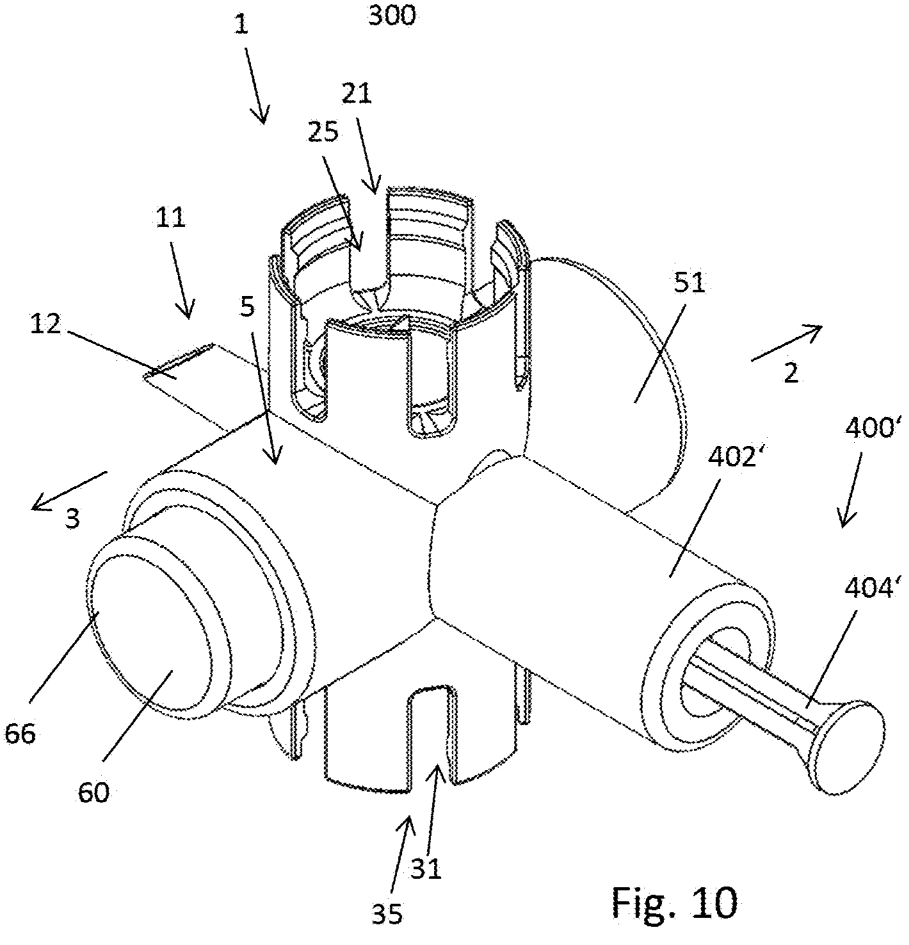
FIG. 10 is a perspective illustration of another example of a fluid transfer device.

The body 5 comprises a fourth fluid channel 40. The fourth connecting portion 41 may be only optionally implemented. In another example as illustrated in FIG. 10, the pump device 400 may be integrally formed with the body 5 of the fluid transfer device 1.

The body 5 of the fluid transfer device 1 comprises the first fluid channel 10, the second fluid channel 20, the third fluid channel 30 and the fourth fluid channel 40.

Figure 5:
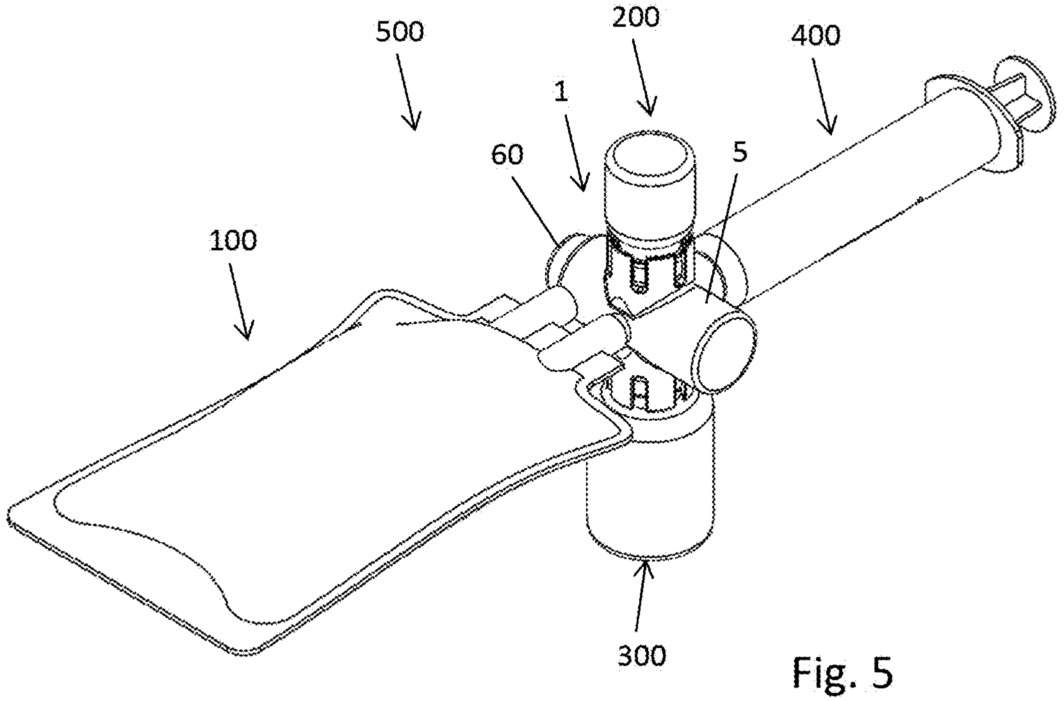
FIG. 5 is a perspective illustration of the kit of FIG. 3 with the fluid transfer device in a second configuration.
Figure 7:
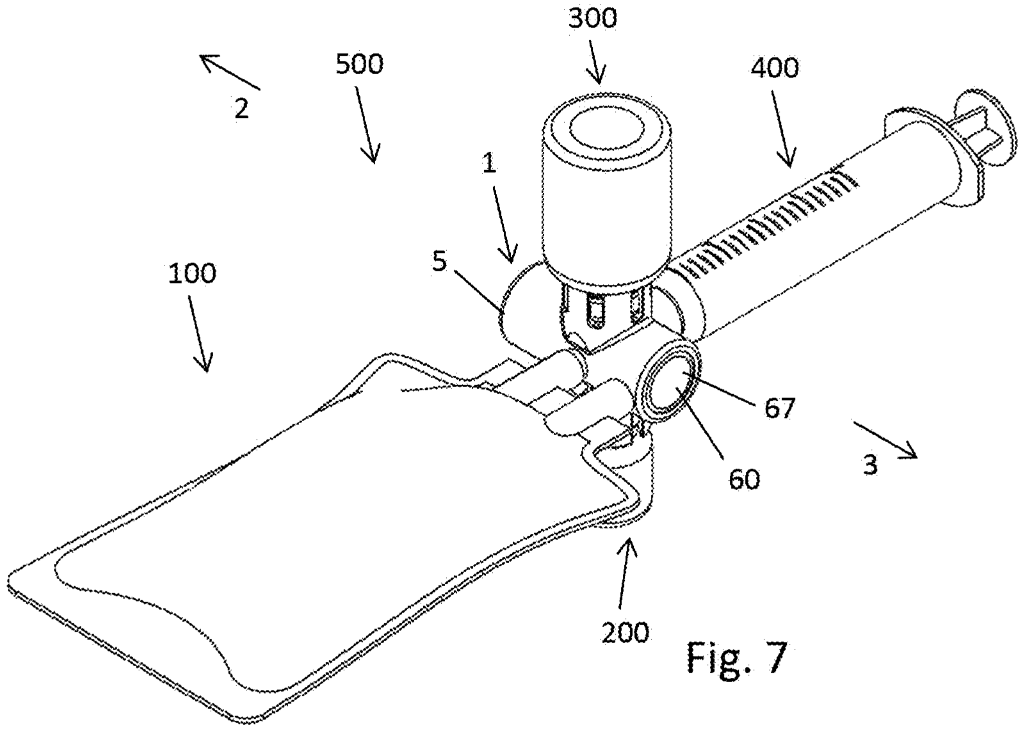
FIG. 7 is a perspective illustration of the kit of FIG. 3 with the fluid transfer device in a third configuration.

The fluid transfer device 1 comprises a movable part 60, which is movable between a first position as shown in FIG. 3, a second position as shown in FIG. 5, and a third position as shown in FIG. 7. The position of the movable part 60 relative to the body 5 defines respective first, second and third configurations of the fluid transfer device 1.

In the first configuration, a fluid communication is between the second fluid channel 20 and the third fluid channel 30. In this way, the interior 202 of the medicament container 200 may fluidically communicate with the interior 302 of the pooling container 300. Here, a content of the medicament container 200 may be transferred through the fluid transfer device 1 into the pooling container 300.

In the second configuration, a fluid communication is between the first fluid channel 10 and the third fluid channel 30. There may be further provided a fluid communication between the fourth fluid channel 40 and at least one of the first fluid channel 10 and the third fluid channel 30.

With the pump device 400 in fluid communication with the fourth fluid channel 40 there can be applied a negative pressure and a positive pressure to the fourth fluid channel 40. In a suction mode, e.g., when withdrawing the plunger 404 out of the barrel 402, there can be applied a negative pressure to the fourth fluid channel 40. In the second configuration there is provided and allowed a flow of fluid from the first fluid channel 10 into the fourth fluid channel 40 while a flow of fluid from the fourth fluid channel 40 back into the first fluid channel 10 is blocked or prevented. In the second configuration there is further provided and allowed a flow of fluid from the fourth fluid channel 40 into the third fluid channel 30 while a flow of fluid from the fourth fluid channel into the first fluid channel 10 is effectively blocked or prevented.

Accordingly, and when applying a negative pressure by the pump device 400 an amount of a diluent initially provided in the diluent container 100 can be transferred into the fourth fluid channel 40 and further into the pump device 400. When subsequently applying a positive pressure, e.g., by expelling the diluent withdrawn into the pump device 400 into the fourth fluid channel 40, the respective flow of fluid can be redirected into the third fluid channel and hence into the interior 302 of the pooling container 300. Here, a return of the diluent from the pump device 400 into the diluent container 100 can be effectively prevented.

In the third configuration a fluid communication is between the first fluid channel 10 and the third fluid channel 30. There may be further provided a fluid communication between the fourth fluid channel 40 and at least one of the first fluid channel 10 and the third fluid channel 30.

Here, and with the pump device 400 in fluid communication with the fourth fluid channel 40 there can be applied a negative pressure and a positive pressure to the fourth fluid channel 40. In a suction mode, e.g., when withdrawing the plunger 404 out of the barrel 402, there can be applied a negative pressure to the fourth fluid channel 40. In the third configuration there is provided and allowed a flow of fluid from the third fluid channel 30 into the fourth fluid channel 40 while a flow of fluid from the fourth fluid channel 40 back into the third fluid channel 30 is blocked or prevented. In the third configuration there is further provided and allowed a flow of fluid from the fourth fluid channel 40 into the first fluid channel while a flow of fluid from the fourth fluid channel into the third fluid channel is effectively blocked or prevented.

Accordingly, and when applying a negative pressure by the pump device 400 an amount of a fluid provided in the pooling container 300 can be transferred into the fourth fluid channel 40 and further into the pump device 400. When subsequently applying a positive pressure, e.g., by expelling the fluid previously withdrawn into the pump device 400 into the fourth fluid channel 40, the respective flow of fluid can be redirected into the first fluid channel 10 and hence into the interior 102 of the diluent container 100. Here, a return of the fluid from the pump device 400 into the pooling container 300 can be effectively prevented.

The body 5 comprises a cavity 50, which defines a longitudinal direction. Inside the cavity 50 a movable part 60 is longitudinally displaceable, i.e., along a first longitudinal direction 2 and along an opposite longitudinal second direction 3 as indicated in FIG. 1. The cavity 50 is confined by a sidewall 51 with an inside surface 52. The first fluid channel 10, the second fluid channel 20, the third fluid channel 30 and the fourth fluid channel 40 each merge into the cavity 50 and penetrate or intersected the sidewall 51 of the cavity 50.

Hence, and inside end of the fluid channels 10, 20, 30, 40 is flush with and terminates in the inside surface 52 of the sidewall 51 of the cavity 50 of the body 5.

The inside surface 52 is of tubular or cylindrical shape. It is complementary shaped to an outside surface 65 of a sidewall 64 of the movable part 60. The movable part 60 may comprise a movable body 61, e.g., of a cylindrical shape. The movable body 61 may hence comprise a cylinder 62. The movable part 60 comprises an insert portion 68, which is movably arranged inside the receptacle or cavity 50 of the body 5. The movable part 60 as such may comprise or constitute a valve insert 63 movably arranged inside the cavity 50, which may provide a valve seat. The movable part 60 further comprises an actuating portion 69, which at least partially protrudes in the longitudinal direction from a longitudinal end of the cavity 50. The actuating portion 69 may protrude along the second direction 3 from the body 5.

The actuating portion 69 may be hence actuatable, e.g., manually actuatable by a user of the fluid transfer device 1. The movable part 60 may be in a gliding or sliding engagement with the sidewall 51 of the cavity 50.

The movable part 60 may be intersected by a first transfer channel 70, by a second transfer channel 80 and by a third transfer channel 90. The first, second, and third transfer channels 70, 80, 90 may be separated from each other in the longitudinal direction as indicated in FIG. 2.

The respective transfer channels 70, 80, 90 may each completely intersect the movable part 60 in a transverse or radial direction. The actuating portion 69 of the movable part 60 comprises a longitudinal end face 66. The opposite side or opposite longitudinal end of the movable part 60 may be provided with or may comprise a respective end face 67. A user may initiate or control a movement of the movable part 60 relative to the body 5 by applying a longitudinally directed force effect onto one of the end faces 66, 67, to thereby induce a longitudinally directed displacement or sliding movement of the movable part 60 relative to the body 5.

Optionally, there may be provided one or numerous gaskets 77, 78, 79 on the outside surface 65 of the insert portion 68. The gaskets 77, 78, 79 may align with the terminal end or inside facing end of the first fluid channel 10, the second fluid channel 20, the third fluid channel 30 and the fourth fluid channel 40 as will be described further below.

As it is further indicated or illustrated in FIGS. 1-10 the first connecting portion 11 protrudes radially outwardly from the tubular sidewall 51. The fourth connecting portion 41 may protrude diametrically opposite from the tubular shaped sidewall 51 compared to the protrusion of the first connecting portion 11. The second connecting portion 21 may also protrude radially outwardly from the sidewall 51 and may protrude diametrically opposite to a respective radially outwardly extending protrusion of the third connecting portion 31. Hence, the first connecting portion 11 may be located diametrically opposite to the optional fourth connecting portion 41. It may be located diametrically opposite to the fourth fluid channel 40.

The second connecting portion 21 and hence the second fluid channel 20 may be located diametrically opposite to the third connecting portion 31 and hence diametrically opposite to the third fluid channel 30. The fluid channels 10, 20, 30, 40 may all extend in a common transverse plane as illustrated in the cross-section of FIGS. 4, 6, 8, and 9, which common transverse plane extends substantially perpendicular to the longitudinal direction as indicated by the first and the second opposite directions 2, 3.

The first connecting portion 11 comprises a diluent container spike 12, which comprises a tapered proximal tipped end for piercing a pierceable seal 104 of a port structure 103 of the diluent container 100.

As particularly illustrated in FIG. 3 the diluent container 100 comprises a flexible bag 101 with two separate port structures 103, 105. The flexible bag 101 may comprise one or several layers of a pliable sheet 108, which may be welded or seamed along a circumferential seam 106. The port structures 103, 105 may comprise a pierceable seal 104, which may be penetrable by the diluent container spike 12. In further examples (not illustrated) at least one of the port structures 103, 105 may comprise a standardized connector, such as a Luer-type connector for establishing a fluid transferring connection between the first fluid channel 10 as provided by or in the first connecting portion 11 and the interior 102 of the diluent container 100.

As further illustrated in FIGS. 1-9, the body 5 further comprises the second connecting portion 21 to attach and/or to connect the medicament container 200 to the second fluid channel 20. The second fluid channel 20 extends in a radial direction as seen with regard to the longitudinal direction. It may terminate radially inwardly in the inside surface 52 of the sidewall 51. In the opposite radial outer direction, it may further extend through or into a receptacle 25 and in particular through a bottom 23 of a receptacle 25, which is implemented to receive a barrel head 208 of the medicament container 200. The receptacle 25 comprises a bottom 23, which may be integrally formed with the sidewall 51 of the body 5. The bottom 23 may comprise a surface normal that faces in a radial direction as seen with regards to the longitudinal direction.

The receptacle 25 may be implemented as a cup-shaped receptacle. The receptacle 25 comprises a somewhat tubular sidewall 26 with numerous sidewall segments 27. The sidewall segments 27 may be elastically deformable radially outwardly with respect to the cylindrical geometry or tubular-shaped geometry of the receptacle 25. The sidewall 26 comprises numerous elongated sidewall segments 27, that are separated in a circumferential direction by longitudinal slits 29. Each or some of the sidewall segments 27 comprise a snap feature 28 to engage in a snap-fitting manner with the barrel head 208 of the medicament container 200. The snap features 28 may be provided with a beveled section 28*a* that engages with the outer rim of the barrel head 208 as the barrel head 208 is pushed coaxially into the receptacle 25.

The second connecting portion 21, which comprises the receptacle 25 may be further provided with a medicament container spike 24, which protrudes longitudinally from the bottom 23 into the receptacle 25.

Figure 4:
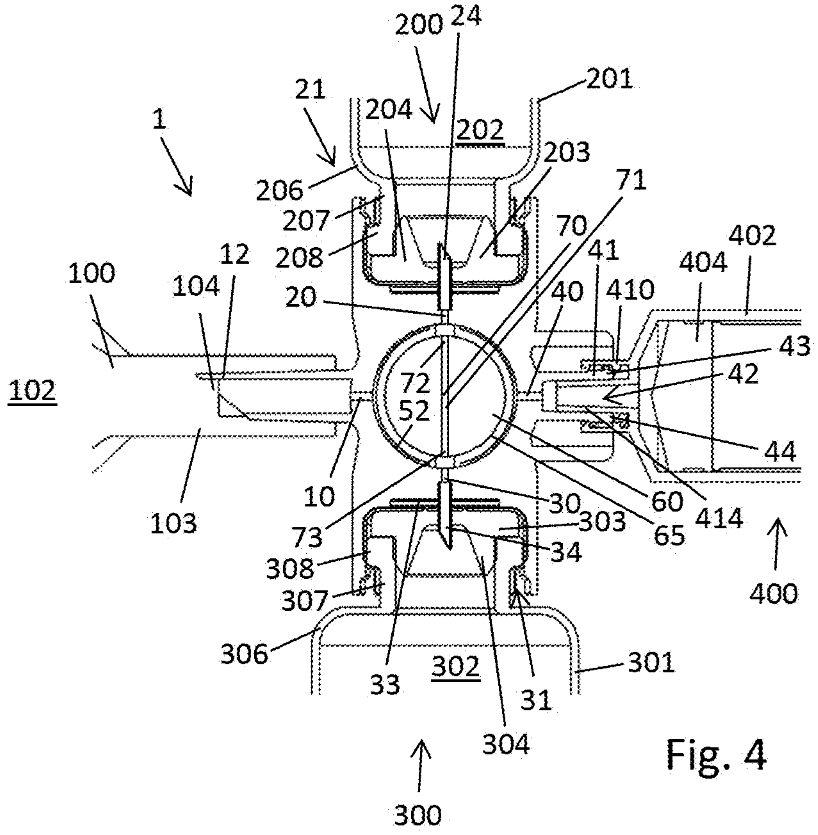
FIG. 4 is a partial, cross-section through the kit of FIG. 3 with the fluid transfer device in a first configuration.

As particularly illustrated in FIG. 4 and when the medicament container 200 is correctly attached to the second connecting portion 21 a radially narrowing shoulder portion 206 of the tubular shaped barrel 201 of the medicament container 200 is located outside the receptacle 25. A radially narrowed neck portion 207 of the barrel 201 may longitudinally align with the snap features 28 of the sidewall segments 27, while the snap features 28 grip under the radially widened barrel head 208 of the barrel 201 of the medicament container 200. When reaching this well-defined fastening configuration, the medicament container spike 24 has penetrated a pierceable seal 204, e.g., in the form of a stopper provided at an outlet end of the medicament container 200. The second fluid channel 20 extends into or through the medicament container spike 24 and gets in fluid communication with the interior 202 of the medicament container 200.

The body 5 further comprises the third connecting portion 31 to attach and/or to connect the pooling container 300 to the third fluid channel 30. The third fluid channel 30 extends in a radial direction as seen with regard to the longitudinal direction. It may terminate radially inwardly in the inside surface 52 of the sidewall 51. In the opposite radial outer direction, it may further extend through or into a receptacle 35 and in particular through a bottom 33 of a receptacle 35, which is implemented to receive a barrel head 308 of the pooling container 300. The receptacle 35 comprises a bottom 33, which may be integrally formed with the sidewall 51 of the body 5. The bottom 33 may comprise a surface normal that faces in a radial direction as seen with regards to the longitudinal direction.

The receptacle 35 may be implemented as a cup-shaped receptacle. The receptacle 35 comprises a somewhat tubular sidewall 36 with numerous sidewall segments 37. The sidewall segments 37 may be elastically deformable radially outwardly with respect to the cylindrical geometry or tubular-shaped geometry of the receptacle 35. The sidewall 36 comprises numerous elongated sidewall segments 37, that are separated in a circumferential direction by longitudinal slits 39. Each or some of the sidewall segments 37 comprise a snap feature 38 to engage in a snap-fitting manner with the barrel head 308 of the pooling container 300. The snap features 38 may be provided with a beveled section 38*a* that engages with the outer rim of the barrel head 308 as the barrel head 308 is pushed coaxially into the receptacle 35.

The third connecting portion 31, which comprises the receptacle 35 may be further provided with a pooling container spike 34, which protrudes longitudinally from the bottom 33 into the receptacle 35 and which is fluidically coupled to the third fluid channel 30.

As particularly illustrated in FIG. 4 and when the pooling container 300 is correctly attached to the third connecting portion 31 a radially narrowing shoulder portion 306 of the tubular shaped barrel 301 of the pooling container 300 is located outside the receptacle 35. A radially narrowed neck portion 307 of the barrel 301 may longitudinally align with the snap features 38 of the sidewall segments 37, while the snap features 38 grip under the radially widened barrel head 308 of the barrel 301 of the pooling container 300. When reaching this well-defined fastening configuration, the pooling container spike 34 has penetrated a pierceable seal 304, e.g., in the form of a stopper provided at an outlet end of the pooling container 300. The third fluid channel 30 extends into or through the pooling container spike 34 and gets in fluid communication with the interior 302 of the pooling container 300.

In some examples the fourth connecting portion 41 comprises a standardized mechanical connector 43 to engage with a complementary shaped counter connector 410 as provided at a respective outlet end of the pump device, e.g., at an outlet of the syringe barrel 402. Accordingly, a sidewall of the receptacle 42 of the fourth connecting portion 41 may be provided with a tapered section 44. In this way and when the mechanical connector 43 of the fourth connecting portion 41 is duly connected with a complementary shaped counter connector 410 of the pump device 400 there can be applied a negative pressure to the fourth fluid channel 40, e.g., by withdrawing the plunger 404 outwardly, hence out of the syringe barrel 402. There can be also provided a positive pressure or there can be expelled a fluid into the fourth fluid channel 40 by pushing the plunger 404 into the syringe barrel 402.

By moving the movable part 60 in the longitudinal direction, e.g., along the first direction 2 or along the second direction 3 the transfer channels 70, 80, 90 can be positioned in the transverse plane of the fluid channels 10, 20, 30, 40, respectively. In a first configuration of the fluid transfer device 1 and when the movable part 60 is in the first position as illustrated in FIGS. 1, 3, and 4 the first transfer channel 70 extends radially through the movable part and in alignment with the second fluid channel 20 and with the third fluid channel 30 as indicated in FIG. 4. The first transfer channel 70 comprises a first passageway 71 extending all through the movable body 61. The first passageway 71 comprises a distal end 72 and an opposite proximal end 73. The distal end 72 and the proximal end 73 may be flush with the outside surface 65 of the movable part 60.

Accordingly, the second fluid channel 20 is in fluid connection with the third fluid channel 30 through the transfer channel 70, which is implemented as a through bore or passageway 71 extending through the body 61 of the movable part 60. The distal end 72 of the first transfer channel 70 is in alignment and is fluidically coupled to the second fluid channel 20. The oppositely located proximal end 73 of the first transfer channel 70 is in alignment and is hence fluidically connected or fluidically coupled to the third fluid channel 30.

In the first configuration as illustrated in FIG. 4 and with an orientation of the fluid transfer device 1 with the medicament container 200 in an upside-down orientation and with the pooling container 300 in an upright orientation a liquid content provided in the medicament container 200 is allowed to flow through the fluid communication between the second fluid channel 20 and the third fluid channel 30. In this way the liquid content of the medicament container 200 can be transferred into the pooling container 300 under the effect of gravity.

In the pooling configuration and hence in the first configuration of the fluid transfer device 1 and after transferring the liquid content of the medicament container 200 into the pooling container 300 the medicament container 200 may be disconnected from the second connecting portion 21 and another medicament container provided with another or with a further liquid medicament can be connected to the second connecting portion 21.

Accordingly, the content of the further medicament container 200 (not illustrated) can be pooled and can be hence transferred into the pooling container 300. The volume of the pooling container 300 is larger than the volume of the medicament container 200.

Figure 6:
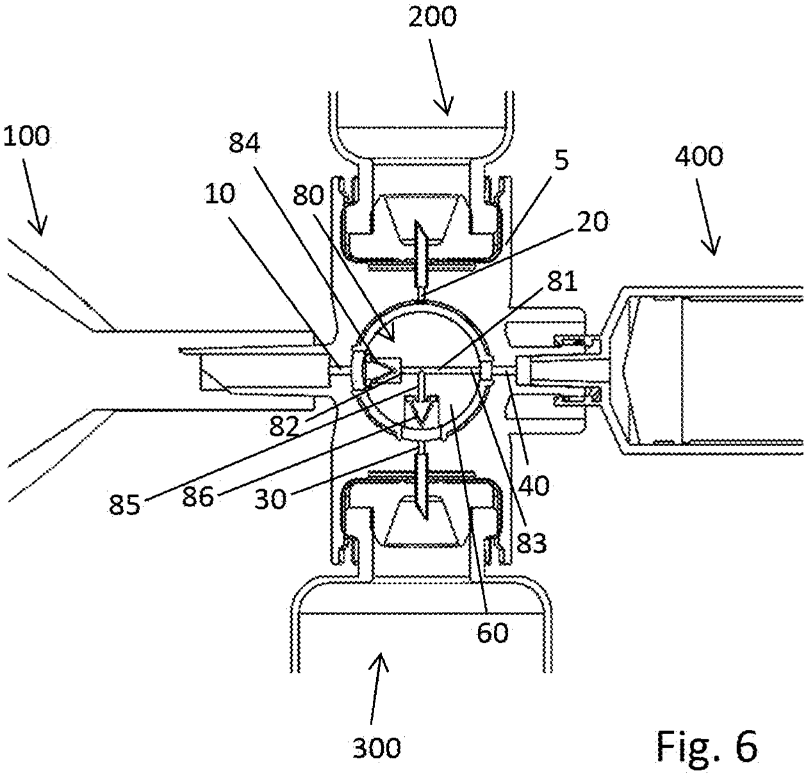
FIG. 6 is a partial, cross-section through the kit of FIG. 5 with the fluid transfer device in the second configuration.

After having transferred the content of at least one medicament container or of several medicament containers 200 into the pooling container 300 the fluid transfer device 1 can be transferred or switched into the second configuration as illustrated in FIGS. 5 and 6. Transferring of the fluid transfer device 1 into the second configuration may require pushing the movable part 60 along the first direction 2 relative to the body 5. The second configuration may be characterized by a particular predefined second position of the movable part 60 relative to the body 5. Here and when reaching the second configuration or second position the second transfer channel 80 is aligned with the first fluid channel 10, the third fluid channel 30 and the fourth fluid channel 40.

The previous fluid communication between the second fluid channel 20 and third fluid channel 30 is abrogated by moving the first transfer channel 70 out of the plane of the fluid channels 10, 20, 30, 40. As it is particularly illustrated in FIG. 6 the second transfer channel 80, which in the second configuration is now aligned with the fluid channels 10, 30, and 40 comprises a second passageway 81 with a distal end 82 and a proximal end 83. In the second configuration of the fluid transfer device the distal end 82 of the second passageway 81 is in alignment with the first fluid channel 10. The proximal end 83 of the second passageway 81 is in alignment and hence in fluid communication with the fourth fluid channel 40.

The second transfer channel 80 further comprises a first branch section 85 that merges into the second passageway 81. The first branch section 85 merges into the second passageway 81 at a position located between the distal end 82 and the proximal end 83. An opposite end of the first branch section 85 is in alignment with the third fluid channel 30.

The second transfer channel is further provided with a first check valve 84 and a second check valve 86. The first check valve 84 is located at the distal end 82 of the second passageway 81. The second check valve 86 is located in the first branch section 85. The first check valve 84 is configured to allow and/or to support a flow of a fluid from the first fluid channel 10 into the second transfer channel 80 and specifically, into the second passageway 81. The first check valve 84 is configured to block or to prevent an oppositely directed fluid flow. Hence, the first check valve 84 is configured to prevent or to block a flow of fluid from the second passageway 81 back into the first fluid channel 10.

The second check valve 86 is configured to support and/or to allow a flow of fluid from the second passageway 81 into the first branch section 85 and further into the third fluid channel 30. It is configured to block or to prevent an oppositely directed flow of fluid, namely from the third fluid channel 30 back into the first branch section 85.

With the configuration of the second transfer channel 80 as shown in FIG. 6, there can be withdrawn a diluent from the diluent container 100 through the first fluid channel 10 into the second passageway 81 and further into the fourth fluid channel 40 when there is applied a negative pressure to the fourth fluid channel 40, e.g., by moving the plunger 404 out of the syringe barrel 402 of the pump device 400. Hence, in a suction mode or when applying a negative pressure to the fourth fluid channel 40 the respective negative pressure is configured to withdraw an amount of a diluent into the pump device 400.

When expelling the diluent from the pump device 400, e.g., by inserting the plunger 404 into the barrel 402 there is applied a positive pressure to the fourth fluid channel 40. While the first check valve 84 effectively blocks a respective flow of fluid towards the first fluid channel 10 the second check valve 86 allows and supports a flow of fluid into the third fluid channel 30. Accordingly, and when expelling an amount of the diluent from the pump device 400 into the fourth fluid channel 40 the respective diluent will be transferred into the pooling container 300.

The steps of alternately applying a negative and a positive pressure to the fourth fluid channel 40 may be repeated multiple times to transfer a well-defined amount of a diluent from the diluent container 100 into the pump device 400 and from the pump device 400 into the pooling container 300. In this way a well-defined amount of a diluent can be mixed with the medicament inside the pooling container 300.

When the pump device 400 comprises a scale 406, e.g., when the barrel 402 is provided with a visual scale 406 on its sidewall the amount of diluent transferred from the diluent container 100 into the pooling container 300 can be precisely measured and/or controlled.

Figure 8:
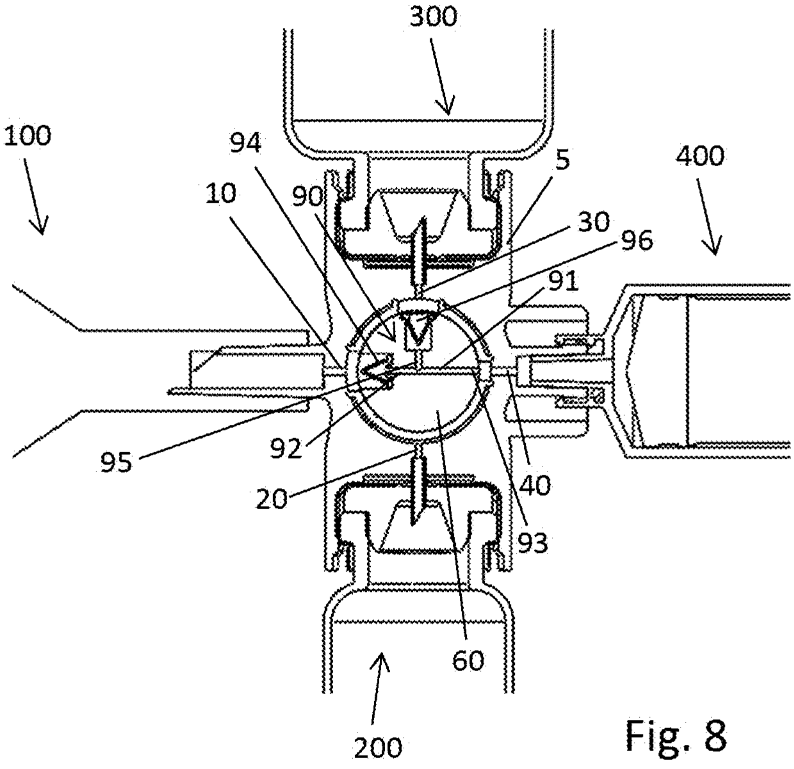
FIG. 8 is a partial, cross-section through the kit of FIG. 7 with the fluid transfer device in the third configuration.

After having diluted the medicament located inside the pooling container 300 with an amount of diluent from the diluent container 100, the fluid transfer device 1 can be transferred or switched into the third configuration as illustrated in FIGS. 7 and 8. Transferring of the fluid transfer device 1 into the third configuration may require to push the movable part 60 further along the first direction 2 relative to the body 5. The third configuration may be characterized by a particular predefined third position of the movable part 60 relative to the body 5. Here and when reaching the third configuration or third position the third transfer channel 90 is aligned with the first fluid channel 10, the third fluid channel 30 and with the fourth fluid channel 40.

The previous fluid communication between the fluid channels 10, 30, and 40 is abrogated by moving the second transfer channel 80 out of the plane of the fluid channels 10, 20, 30, 40. As it is particularly illustrated in FIG. 8 the third transfer channel 90, which in the third configuration is now aligned with the fluid channels 10, 30, and 40 comprises a third passageway 91 with a distal end 92 and a proximal end 93. In the third configuration of the fluid transfer device 1 the distal end 92 of the third passageway 91 is in alignment with the first fluid channel 10. The proximal end 83 of the third passageway 91 is in alignment and hence in fluid communication with the fourth fluid channel 40.

The third transfer channel 90 further comprises a second branch section 95 that merges into the third passageway 91. The second branch section 95 merges into the third passageway 91 at a position located between the distal end 92 and the proximal end 93. An opposite end of the second branch section 95 is in alignment with the third fluid channel 30.

The third transfer channel 90 is further provided with a third check valve 94 and a fourth check valve 96. The third check valve 94 is located at the distal end 92 of the third passageway 91. The fourth check valve 96 is located in the second branch section 95. The third check valve 94 is configured to allow and/or to support a flow of a fluid from the fourth fluid channel 40 into the third transfer channel 90 further into the first fluid channel 10. The third check valve 94 is configured to block or to prevent an oppositely directed fluid flow. Hence, the third check valve 94 is configured to prevent or to block a flow of fluid from the first fluid channel 10 into the third passageway 91.

The fourth check valve 96 is configured to support and/or to allow a flow of fluid from the third fluid channel 30 into the second branch section 95 and further into the third passageway 91. It is configured to block or to prevent an oppositely directed flow of fluid, namely from the third passageway 91 into the third fluid channel 30.

With the configuration of the third transfer channel 90 as shown in FIG. 8, there can be withdrawn a liquid diluted medicament from the pooling container 300 through the third fluid channel 30 into the second branch section 95 and further into the third passageway 91 and further into the fourth fluid channel 40 when there is applied a negative pressure to the fourth fluid channel 40, e.g., by moving the plunger 404 out of the syringe barrel 402 of the pump device 400. Hence, in a suction mode or when applying a negative pressure to the fourth fluid channel 40 the respective negative pressure is configured to withdraw an amount of the medicament from the pooling container 300.

When expelling the medicament from the pump device 400, e.g., by inserting the plunger 404 into the barrel 402 there is applied a positive pressure to the fourth fluid channel 40. While the fourth check valve 96 effectively blocks a respective flow of fluid towards third fluid channel 30 the third check valve 94 allows and supports a flow of fluid into the first fluid channel 10 and hence into the diluent container 100. Accordingly, and when expelling an amount of the medicament from the pump device 400 into the fourth fluid channel 40 the respective medicament will be transferred into the diluent container 100.

The steps of alternately applying a negative and a positive pressure to the fourth fluid channel 40 may be repeated multiple times to transfer a well-defined amount of the diluted medicament from the pooling container 300 into the pump device 400 and from the pump device 400 into the diluent container 100. In this way a well-defined amount of a medicament can be mixed with the diluent inside the diluent container 100.

When the pump device 400 comprises a scale 406, e.g., when the barrel 402 is provided with a visual scale 406 on its sidewall the amount of a diluted medicament transferred from the pooling container 300 into the diluent container 100 can be precisely measured and/or controlled.

However, before or after transferring the fluid transfer device 1 from the second configuration into the third configuration it may be beneficial or it may be required to alter or to flip the orientation of the fluid transfer device 1 and the orientation of the medicament container 200 and the pooling container 300. As indicated in FIGS. 7 and 8, the pooling container 300 is now located above the medicament container 200. Here, and under the effect of gravity an amount of a liquid substance can be easily withdrawn from the upside-down oriented pooling container 300 when making use of the pump device 400 as described above.

Figure 9:
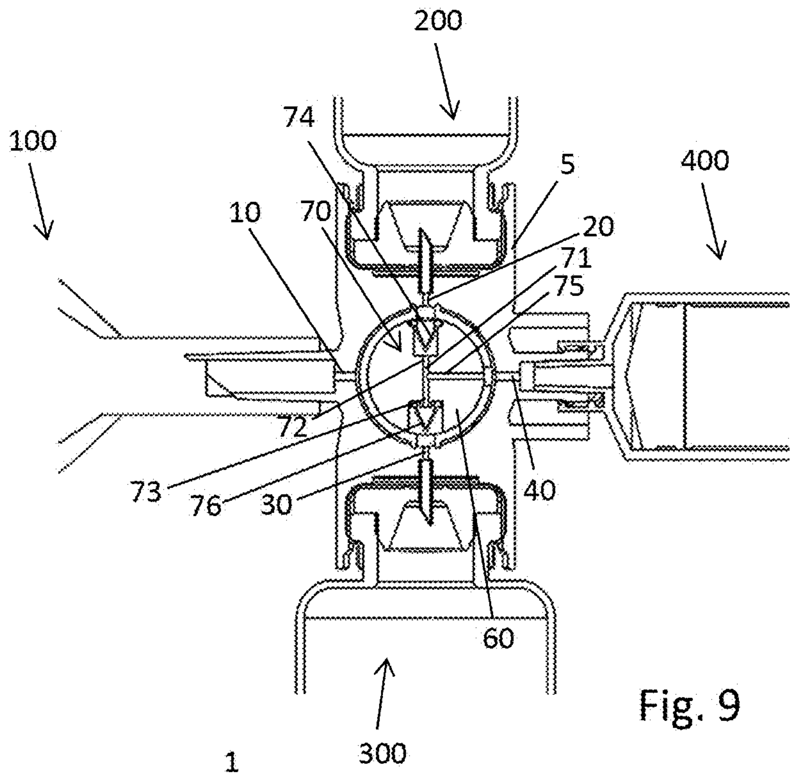
FIG. 9 is a partial, cross-section through an alternative example of a fluid transfer device.

In another example as shown in FIG. 9 the fluid transfer device 1 is in an alternative first configuration. Here, the first transfer channel 70 also comprises a first passageway 71 with a distal end 72 and a proximal and 73. Here, the distal end 72 of the first passageway 71 is in alignment with the second fluid channel 20. The proximal end 73 is in alignment with the third fluid channel 30. Here, and in contrast to the example as shown in FIG. 4, the first transfer channel 70 further comprises a further branch section 75 merging into the first passageway 71. An opposite end of the further branch section 75 is aligned with the fourth fluid channel 40. It is also fluidically coupled or fluidically connected to the fourth fluid channel 40.

The distal end of the first passageway 71 one is provided with a fifth check valve 74 and the proximal end 73 of the first passageway 71 is provided with a sixth check valve 76. The fifth check valve 74 is operable or configured to allow or to support a flow of fluid from the second fluid channel 20 into the first passageway 71 and hence into the first transfer channel 70. It is effective to block or to prevent an oppositely directed flow of fluid, namely from the first passageway 71 or first transfer channel 70 back into the second fluid channel 20. The sixth check valve 76 is oriented in an opposite sense. It allows and supports a flow of fluid from the first fluid transfer channel 70 into the third fluid channel 30 but prevents a flow of fluid from the third fluid channel 30 into the first fluid transfer channel 70.

The example according to FIG. 9 is of particular benefit to make use of the pump device 400 in flow connection with the fourth fluid channel 40 to induce a withdrawal of a liquid substance from the medicament container 200 to provide expelling of the medicament previously withdrawn from the medicament container 200 into the pooling container 300. By applying a negative pressure with the pump device 400 an amount of the medicament initially provided inside the medicament container 200 can be transferred into the pump device 400. The medicament transferred into the pump device 400 can be then expelled from the pump device 400 into the fourth fluid channel 40 and further into the third fluid channel 30 and hence into the pooling container.

This example or embodiment of the fluid transfer device 1 may be of particular benefit for liquid medicaments that are highly viscous and/or which may not easily flow from the medicament container 200 into the pooling container 300 under the effect of gravity only.

The further example as shown in FIG. 10 is indicative of another fluid transfer device 1, where the pump device 400 is integrated into the body 5 of the fluid transfer device 1. Here, the body 5 may be provided with a pump device section 400'. The barrel portion 402' of the pump device section 400' may protrude radially outwardly from the sidewall 51 of the body 5.

The plunger 404' may be in longitudinal sliding engagement with the barrel portion 402'. An inside of the barrel portion 402' may be in permanent fluid communication with the fourth fluid channel 40.

Figure 11:
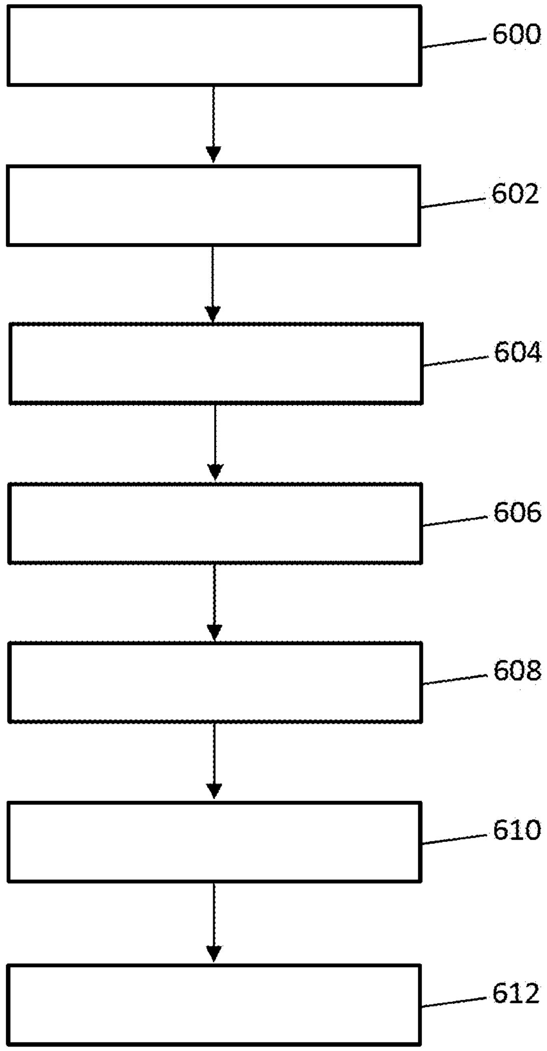
FIG. 11 is a flowchart of a method of transferring a fluid between a diluent container, a medicament container, and a pooling container.

In the flowchart according to FIG. 11 numerous steps of conducting a method of transferring of a fluid between a diluent container 100, a medicament container 200 and a pooling container 300 are illustrated. In a first step 600 there may be provided a kit 500 as schematically illustrated in FIG. 3. The kit 500 comprises a fluid transfer device 1, a diluent container 100, a medicament container 200, a pooling container 300 and a pump device 400. In step 602 the diluent container 100 is connected to the first connecting portion 11. The medicament container 200 is connected to the second connecting portion 21. The pooling container 300 is connected to the third connecting portion 31. Optionally and if not yet in fluid communication with the fourth fluid channel 40 the pump device 400 is connected to the fourth connecting portion 41.

In step 602 the fluid transfer device is transferred into the first configuration thereby establishing a fluid communication or fluid connection between the second fluid channel 20 and the third fluid channel 30. In step 604 the content of the medicament container 200 is allowed to flow through the fluid transfer device 1 into the pooling container 300. In step 606 the fluid transfer device 1 is transferred into the second configuration, e.g., by moving the movable part 60 from the first position into the second position. In step 608 the pump device 400 is used to withdraw an amount of a diluent from the diluent container 100 and to transfer the amount of the diluent into the pump device 400. Thereafter the diluent is expelled from the pump device 400 back into the fourth fluid channel 40 and is redirected into the third fluid channel 30 and hence into the pooling container.

Step 608 may be repeated several times until a required or predefined amount of a diluent is transferred into the pooling container 300. Thereafter, and in step 610 the fluid transfer device 1 is transferred or switched into the third configuration, e.g., by moving the movable part 60 further along the first direction 2 until it reaches the third position relative to the body 5. In the third configuration and in step 612 the pump device 400 is repeatedly used to alternatively apply a negative and a positive pressure to the fourth fluid channel 40.

Optionally, and between steps 610 and 612, the position or orientation of the medicament container 200 and the pooling container 300 may be switched or inverted so as to support a withdrawal of a liquid substance from the interior of the 302 of the pooling container 300.

When applying a negative pressure to the fourth fluid channel 40 and when oriented in an upside-down configuration as shown in FIG. 8 the negative pressure in the fourth fluid channel 40 induces a withdrawal of the liquid content from the pooling container 300 into the pump device 400. Subsequently the pump device 400 is used to expel the liquid substance into the fourth fluid channel 40, which liquid substance is then redirected into the diluent container 100.

Step 612 may be repeated multiple times until a predefined amount of the content of the pooling container 300 has been transferred in the diluent container 100. Thereafter, the diluent container 100 may be disconnected from the fluid transfer device 1 and may be connected to an injection device (not illustrated) for administering the content of the diluent container by way of infusion or injection.

REFERENCE NUMBERS

1 fluid transfer device
2 direction
3 direction
5 body
10 fluid channel
11 connecting portion
12 diluent container spike
20 fluid channel
21 connecting portion
23 bottom
24 medicament container spike
25 receptacle
26 sidewall
27 sidewall segment
28 snap feature
**28*a*** beveled section
29 slit
30 fluid channel
31 connecting portion
33 bottom
34 pooling container spike
35 receptacle
36 sidewall
37 sidewall segment
38 snap feature
**38*a*** beveled section
39 slit
40 fluid channel
41 connecting portion
42 receptacle
43 connector
44 tapered section
50 cavity
51 sidewall
52 inside surface
60 movable part
61 movable body
62 cylinder
63 valve insert
64 sidewall
65 outside surface
66 end face
67 end face
68 insert portion

69 actuating portion
70 transfer channel
71 first passageway
72 distal end
73 proximal end
74 check valve
75 first branch section
76 check valve
77 gasket
78 gasket
79 gasket
80 second transfer channel
81 second passageway
82 distal end
83 proximal end
84 check valve
85 first branch section
86 check valve
90 third transfer channel
91 third passageway
92 distal end
93 proximal end
94 check valve
95 second branch section
96 check valve
100 diluent container
101 flexible bag
102 interior
103 port structure
104 pierceable seal
105 port structure
106 seam
108 sheet
200 medicament container
201 barrel
202 interior
203 closure
204 pierceable seal
206 shoulder portion
207 neck portion
208 barrel head
300 pooling container
301 barrel
302 interior
303 closure
304 pierceable seal
306 shoulder portion
307 neck portion
308 barrel head
400 pump device
401 syringe
402 syringe barrel
404 plunger
406 scale
410 counter connector
414 tapered section
500 kit

The invention claimed is:

1. A fluid transfer device for transferring a fluid between a diluent container, a medicament container, and a pooling container, the fluid transfer device comprising:

a body comprising:

a first connecting portion configured to connect to the diluent container and comprising a first fluid channel configured to fluidically communicate with an interior of the diluent container;

a second connecting portion configured to connect to the medicament container and comprising a second fluid channel configured to fluidically communicate with an interior of the medicament container;

a third connecting portion configured to connect to the pooling container and comprising a third fluid channel configured to fluidically communicate with an interior of the pooling container; and a fourth fluid channel configured to fluidically communicate with a pump device; and a movable part engaged with the body and movable relative to the body to transfer the fluid transfer device into one of a first configuration, a second configuration, and a third configuration, wherein when in the first configuration, the second fluid channel is fluidically coupled to the third fluid channel to allow a flow of fluid from the medicament container into the pooling container, and wherein when in the second configuration, the first fluid channel is fluidically connectable to the third fluid channel to allow a flow of fluid from the diluent container into the pooling container.

2. The fluid transfer device according to claim 1, wherein when in the second configuration, a flow of fluid from the pooling container into the diluent container is prevented.

3. The fluid transfer device according to claim 1, wherein when in the third configuration, the second fluid channel is fluidically connectable to the third fluid channel to allow a flow of fluid from the pooling container into the diluent container.

4. The fluid transfer device according to claim 1, wherein when in the third configuration, a flow of fluid from the diluent container into the pooling container is prevented.

5. The fluid transfer device according to claim 1, wherein the fluid transfer device is transferable into the first configuration, the second configuration, and/or the third configuration by moving the movable part into a first position, a second position, and/or a third position relative to the body.

6. The fluid transfer device according to claim 1, wherein the movable part comprises a first transfer channel with a first passageway, wherein the first transfer channel is aligned and fluidically coupled with the second fluid channel and with the third fluid channel when the fluid transfer device is in the first configuration.

7. The fluid transfer device according to claim 1, wherein the movable part comprises a second transfer channel that is aligned and fluidically coupled with the first fluid channel and with the third fluid channel, wherein the second transfer channel is configured to allow a flow of fluid from the first fluid channel into the third fluid channel when the fluid transfer device is in the second configuration.

8. The fluid transfer device according to claim 7, wherein the second transfer channel comprises:

a second passageway comprising a distal end aligned and fluidically coupled with the first fluid channel, and a proximal end aligned and fluidically connectable with the fourth fluid channel, when the fluid transfer device is in the second configuration; and a first branch section merging into the second passageway and fluidically connectable with the third fluid channel when the fluid transfer device is in the second configuration.

9. The fluid transfer device according to claim 1, wherein the movable part comprises a third transfer channel that is aligned and fluidically coupled with the first fluid channel and with the third fluid channel, and wherein the third transfer channel is configured to allow a flow of fluid from the third fluid channel into the first fluid channel when the fluid transfer device is in the third configuration.

10. The fluid transfer device according to claim 9, wherein the third transfer channel comprises:

a third passageway comprising a distal end aligned and fluidically coupled with the first fluid channel, and a proximal end aligned and fluidically connectable with the fourth fluid channel when the fluid transfer device is in the third configuration; and a second branch section merging into the third passageway and fluidically connectable with the third fluid channel when the fluid transfer device is in the third configuration.

11. The fluid transfer device according to claim 1, wherein the fourth fluid channel is fluidically coupled with at least one of the first fluid channel and the third fluid channel when the fluid transfer device is in one of the second configuration and the third configuration.

12. The fluid transfer device according to claim 1, wherein the body comprises a cavity confined by a sidewall and defining a longitudinal direction, and wherein one or more of the first fluid channel, the second fluid channel, the third fluid channel, and the fourth fluid channel extends through the sidewall and merges into the cavity.

13. The fluid transfer device according to claim 12, wherein the movable part comprises an insert portion that is movably arranged inside the cavity.

14. The fluid transfer device according to claim 12, wherein the fluid transfer device is transferable between the first configuration, the second configuration, and the third configuration by moving the movable part inside the cavity in the longitudinal direction relative to the body.

15. A method of administering an injectable medicament, the method comprising:

preparing the injectable medicament by transferring a fluid between a diluent container, a medicament container, and a pooling container by using a fluid transfer device, wherein the fluid transfer device comprises:

a body comprising:

a first connecting portion configured to connect to the diluent container, the first connecting portion comprising a first fluid channel configured to fluidically communicate with an interior of the diluent container;

a second connecting portion configured to connect to the medicament container, the second connecting portion comprising a second fluid channel configured to fluidically communicate with an interior of the medicament container;

a third connecting portion configured to connect to the pooling container, the third connecting portion comprising a third fluid channel configured to fluidically communicate with an interior of the pooling container; and a fourth fluid channel configured to fluidically communicate with a pump device; and a movable part engaged with the body and movable relative to the body to transfer the fluid transfer device into one of a first configuration, a second configuration, and a third configuration, wherein when in the first configuration, the second fluid channel is fluidically coupled to the third fluid channel to allow a flow of fluid from the medicament container into the pooling container, and wherein when in the second configuration, the first fluid channel is fluidically connectable to the third fluid channel to allow a flow of fluid from the diluent container into the pooling container.

* * * * *